United States Patent [19]
Naito et al.

[11] Patent Number: 6,092,028
[45] Date of Patent: Jul. 18, 2000

[54] APPARATUS FOR ESTIMATING TIRE AIR PRESSURE

[75] Inventors: Toshiharu Naito, Okazaki; Takeyasu Taguchi, Obu; Hideki Kabune, Chiryu; Yuichi Inoue, Tajimi; Nobuyoshi Onogi, Nagoya, all of Japan

[73] Assignee: Densco Corporation, Kariya, Japan

[21] Appl. No.: 09/131,171

[22] Filed: Aug. 7, 1998

[30] Foreign Application Priority Data

| Aug. 8, 1997 | [JP] | Japan | 9-214229 |
| Dec. 15, 1997 | [JP] | Japan | 9-345381 |
| Dec. 17, 1997 | [JP] | Japan | 9-348087 |
| Jul. 27, 1998 | [JP] | Japan | 10-211218 |
| Jul. 27, 1998 | [JP] | Japan | 10-211219 |

[51] Int. Cl.[7] ................................................. B60C 23/00
[52] U.S. Cl. ........................................ 702/47; 702/138
[58] Field of Search ............................. 702/47, 138, 85, 702/140, 127; 701/73; 73/31.04, 146, 146.2

[56] References Cited

U.S. PATENT DOCUMENTS

| 4,574,267 | 3/1986 | Jones ......................... 340/58 |
| 5,497,657 | 3/1996 | Taguchi et al. ............. 73/146.2 |
| 5,541,859 | 7/1996 | Inoue et al. ................. 364/565 |
| 5,553,491 | 9/1996 | Naito et al. ................. 73/146.5 |
| 5,596,141 | 1/1997 | Nishikawa et al. ......... 73/146.2 |
| 5,606,122 | 2/1997 | Taguchi et al. ............. 73/146.2 |
| 5,753,809 | 5/1998 | Ogusu et al. ............... 73/146.2 |

Primary Examiner—Timothy P. Callahan
Assistant Examiner—Linh Nguyen
Attorney, Agent, or Firm—Pillsbury Madison & Sutro LLP

[57] ABSTRACT

A signal processor comprises wheel speed-detecting means for detecting a wheel speed signal including vibrational components of a tire, extraction means for extracting a resonant frequency of the vibrational components of the tire or a tire spring constant based on the wheel speed signals, air pressure-estimating means for estimating a tire air pressure based on the resonant frequency or the tire spring constant, and determining means for determining whether the estimated tire air pressure is abnormal or not by comparing with a determination value. Further, correcting means corrects at least one of the determination value, the estimated tire air pressure, the resonant frequency and the tire spring constant in response to a tire temperature. A temperature-sensing device is mounted inside the signal processor to detect a temperature associated with the tire temperature.

30 Claims, 23 Drawing Sheets

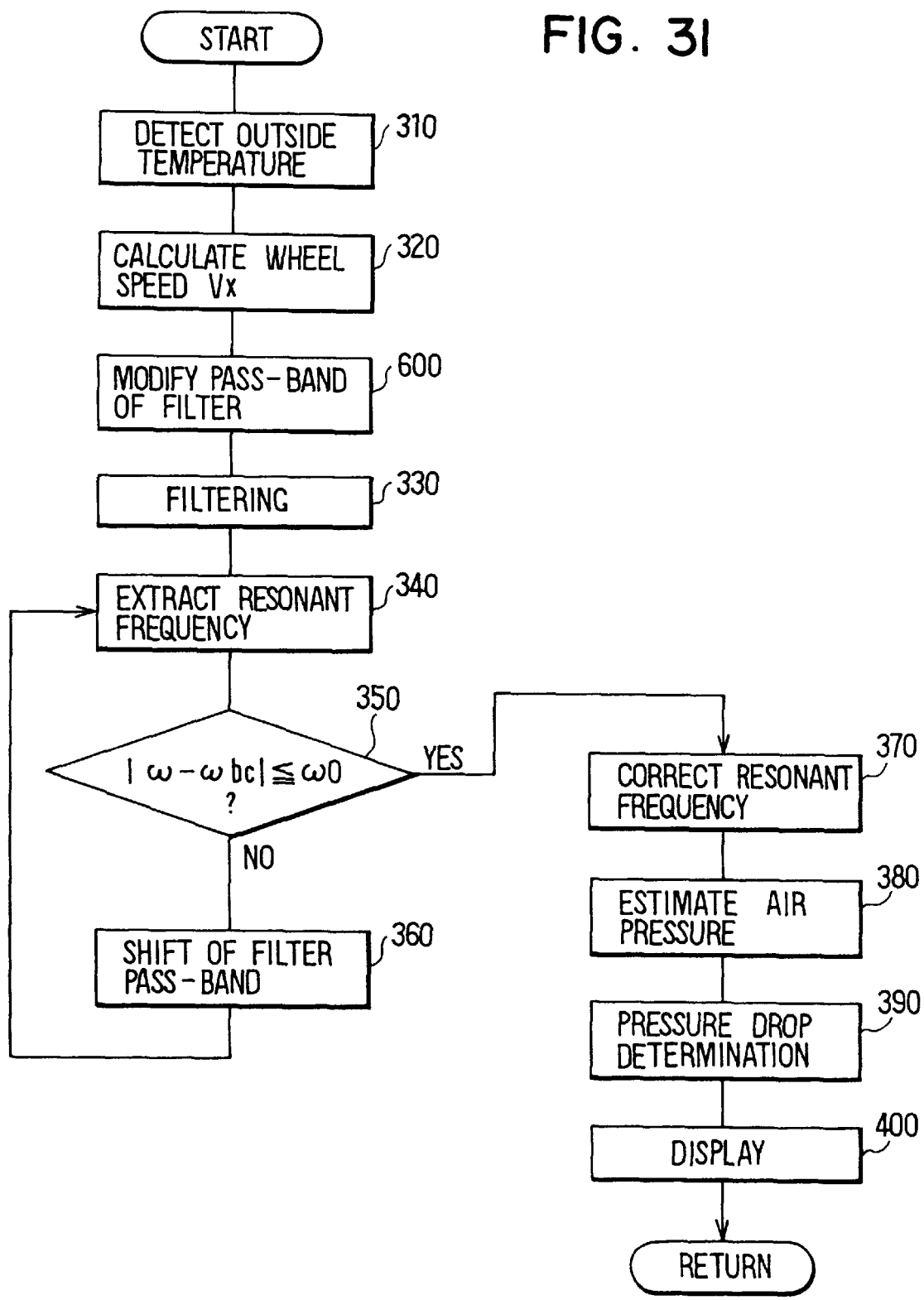

APPARATUS FOR ESTIMATING TIRE AIR PRESSURE

CROSS REFERENCE TO RELATED APPLICATION

This application is based upon and claims the benefit of priority of Japanese Patent Applications No. H.9-214229, No. H.9-345381, No. H.9-348087, No. H.10-211218 and No. H.10-211219, the contents of which are incorporated herein by reference.

BACKGROUND OF THE INVENTION

1. Field of the Invention

This invention relates to an apparatus for estimating tire air pressure in an automobile or the like and, more particularly, to realization of an apparatus capable of estimating tire air pressures indirectly with improved accuracy from vibrational components of tires during vehicle traveling.

2. Related Art

As a tire air pressure estimating apparatus, an apparatus described in Japanese Patent Application Laid-Open No. H.5-133831 and an apparatus described in Japanese Patent Application Laid-Open No. H. 6-328920 have been known.

In each apparatus, the apparatus extracts the vibrational components of wheel speed caused by vibrations of a tire from a wheel speed signal, finds a tire resonant frequency or a tire spring constant in the vertical direction of the tire, in the longitudinal direction of the tire, or in the torsional direction of the tire rotation, and estimates the air pressure in the tire from the found resonant frequency or the found tire spring constant.

In these tire air pressure-estimating apparatuses, tire air pressure can be estimated without requiring means for directly detecting the air pressure inside the tire such as a pressure sensor.

A technique for indirectly detecting tire air pressure takes notice of the fact that a certain relation holds between the air pressure in a tire and its rigidity. However, the tire rigidity depends on tire rubber hardness as well as on the air pressure in the interior space inside the tire. It is difficult to detect them separately. Also, the tire rubber hardness varies with temperature of the rubber.

In the past, the technique for indirectly detecting tire air pressure does not take account of variations of the tire temperature. Therefore, the rigidity of the tire varies as a whole for different tire temperature even if the air pressure in the interior space of the tire is the same. With the prior art indirect detection technique, since the variations of the tire temperature is not taken into account, the detected value of the tire air pressure differs from the actual value.

Consequently, when the prior art apparatus detects abnormally low tire air pressure and warns a driver of this abnormality, for example, various undesirable situations may take place. For instance, if the tire temperature rises to thereby lower the tire rubber hardness, although the actual tire air pressure is normal, the tire air pressure may be determined to be too low. In addition, even though the tire air pressure is too low, it may not be detected.

Accordingly, it is a first object of the present invention to provide an apparatus for estimating tire air pressure with improved accuracy by taking account of the tire temperature.

It is a second object of the present invention to provide an economical tire air pressure-estimating apparatus that, more preferably, has a device for producing a value associated with tire temperature. This device is disposed within a signal processor that performs arithmetical processing for estimating the tire air pressure. This arrangement dispenses with wires for introducing the tire temperature into the signal processor.

In the meantime, frequency components that are not associated with variations in the tire air pressure and thus create noises are contained in a signal containing the vibrational components of the tire. Therefore, when a resonant frequency of the vibrational components or a tire spring constant dependent on tire air pressure is extracted from the signal including the vibrational components of the tire, the signal is normally fed to a signal-processing filter to extract only signal components close to the resonant frequency dependent on the tire air pressure. This is referred to as a pretreatment.

Ideally, the frequency band of this signal-processing filter sufficiently covers a frequency range that contains the signal components corresponding to an air pressure range to be detected within the vibrational components dependent on the tire air pressure. The frequency range containing the signal components corresponding to the air pressure range to be detected does not simply refer to from high to low tire pressures in a used range. The range is varied by the tire temperature due to the nature of the rubber of the tire. At low temperature, the frequency to be detected is increased. Conversely, at high temperature, the frequency to be detected is lowered. Therefore, the frequency range containing signal components corresponding to the air pressure range to be detected is from a frequency under a low-temperature, high-pressure condition to a frequency under a high-temperature, low-pressure condition.

However, this frequency range contains many frequency components becoming noises. Therefore, if a filter that passes signals of a frequency range containing the signal components corresponding to the air pressure range to be detected is adopted, the performance of air pressure detection is made unstable. For this reason, use of a filter having a narrowed frequency passing band has been heretofore urged. Consequently, the accuracy of the estimated air pressure can be assured only in a limited temperature range or pressure range.

In view of these circumstances, a third object of the present invention is to provide a tire air pressure estimating apparatus capable of achieve both improvement in the accuracy of estimation of tire air pressure and system responsiveness by making the filtering characteristics variable.

SUMMARY OF THE INVENTION

The above-described first and second objects are achieved by an apparatus for estimating tire air pressure according to a first aspect of the present invention. The apparatus for estimating tire air pressure comprises a vibrational component output device for producing a signal including vibrational components of a tire during vehicle traveling, an extracting device for extracting a resonant frequency of the vibrational components or a tire spring constant from the produced signal including the vibrational components, an air pressure estimating device for estimating air pressure inside the tire from the extracted resonant frequency or tire spring constant. Further, a tire temperature-associated value-extracting device is provided to extract a value associated with tire temperature affecting the extracted resonant frequency or tire spring constant. A correcting device corrects effects on the resonant frequency or tire spring constant according to the extracted value associated with the tire temperature.

In this structure, the effects of the tire temperature can be eliminated in estimating the tire air pressure. As a result, the accuracy of the estimation of the tire air pressure can be improved.

In recent years, an outside air temperature sensor is mounted on a vehicle to automatically air-conditioning a passenger compartment of the vehicle or to furnish information about freezing of a road surface to the driver during vehicle traveling. When the tire temperature-associated value is detected, if such an outside air temperature sensor is employed, then the number of components is reduced. This is favorable from a viewpoint of cost.

A temperature detecting device may be mounted in a signal processor for processing signals including vibrational components of the tire as the tire temperature-associated value-extracting device. The outside air temperature may be detected as the tire temperature-associated value by the temperature detecting device.

It is desirable to detect the temperature of the rubber of the tire itself as a tire temperature-associated value that changes the hardness of the tire rubber. However, it is relatively difficult to detect it, because the tire rotates. In contrast, it is relatively easy to detect the outside air temperature. It is considered that if the temperature of the air outside the vehicle is high, the temperature of the tire itself rises. In this way, a given relation holds between the outside air temperature and the temperature of the tire itself.

In view of this relation, the accuracy with which the tire air pressure is estimated can be improved using the outside air temperature.

When the outside air temperature sensor used for air-conditioning as mentioned previously is also used for estimation of tire air pressure, a transmission line (transmission wire) is necessary to send a signal from this outside air temperature sensor to the signal processor (CPU) of the tire air pressure-estimating apparatus. This affects the installation of the apparatus. Also, the transmission line may be affected by electromagnetic noises or the like. However, if the temperature detecting device is installed inside the signal processor to detect the outside air temperature as described above, it is not necessary for the signal processor to receive a signal associated with the outside air temperature from the outside. This is favorable in view of cost and installation. In addition, the apparatus is more immune to electromagnetic noises and the like. Further, when a vehicle is not provided with the outside air temperature sensor as used for air-conditioning, installing an outside air temperature sensor inside the signal processor produces greater advantages than installing it outside the signal processor, in the same way as the foregoing.

A temperature detecting sensor having a function of detecting temperature or a semiconductor having temperature characteristics may be incorporated into the signal processor as a device for detecting the outside air temperature. Alternatively, the signal processor may detect the outside air temperature, utilizing the temperature characteristics of the device installed inside the processor to extract the resonant frequency of the tire or the tire spring constant.

The tire temperature-associated value-extracting device may find a time when a given correlation holds between the temperature of the device inside the signal processor and the outside air temperature, and may estimate the aforementioned tire temperature-associated value according to the temperature of the device detected at this time.

The signal processor is often installed in the passenger compartment of the vehicle. Therefore, the device that is a detecting element for estimating the outside air temperature may be affected by the temperature of the passenger compartment. This temperature of the passenger compartment is frequently affected by the air-conditioning system of the vehicle during vehicle traveling. When the vehicle is at halt, the temperature may be often affected by the sunlight. Furthermore, the temperature of the device may be affected by heat generated by the device itself during energization.

The relation between the outside air temperature and the temperature of the device is estimated from the manner in which the vehicle is used for a relatively long time, and the result is shown in FIG. 6. The temperature of the passenger compartment and the temperature of the device within the signal processor agree with the outside air temperature if the vehicle has stopped for a sufficiently long time. Even under actual conditions, it is amply conceivable for the vehicle to be stopped for such a long time. Therefore, if the time when the temperature of the device within the signal processor converges to the outside air temperature during stop of the vehicle is found, and if the tire temperature-associated value is estimated at that time, then more accurate estimation of tire air pressure can be accomplished.

The tire temperature-associated value-extracting device may estimate an outside air temperature-associated value according to plural values detected when an ignition switch of the vehicle is turned on.

To find the time when the temperature of the device within the signal processor converges to the outside air temperature, generation of heat from the device itself is taken into account after the power supply for the signal processor is started. It is advantageous to use the temperature of the device detected immediately after the vehicle ignition switch is turned on in estimating the outside air temperature. In particular, if the outside air temperature is detected immediately after the ignition switch is turned on in this way, the effects of the heat generated by electrical energization on the device may be eliminated. In consequence, the accuracy with which the outside air temperature is estimated can be improved. The outside air temperature detected at this time may be stored in a memory until the outside air temperature is detected when the ignition switch is again turned on, and the stored temperature may be used in estimating the tire air pressure.

To find the time when the temperature of the device within the signal processor converges to the outside air temperature, the number of times the ignition switch is turned on is preset. This number of times is set greater than the number of times the ignition switch is normally turned on per day. It can be assumed that at least one of the preset number of times provides the chance that the device within the signal processor converges to the outside air temperature. For example, in the nighttime, the vehicle is often left outdoors. Therefore, the possibility that the temperature of the device converges to the outside air temperature is high. Increasing the possibility that the temperature of the device inside the signal processor converges to the outside air temperature in this way increases the chance of accurate estimation of the tire air pressure.

The tire temperature-associated value-extracting device may estimate the tire temperature-associated value based on the minimum value of plural values detected immediately after the ignition switch of the vehicle is turned on.

As shown in FIG. 6, the temperature of the device inside the signal processor when the ignition switch is turned on may differ from the actual outside air temperature by the effects of heat generated by the device itself, the effects of the temperature of the passenger compartment due to air-conditioning, and the effects of sunlight. Consideration of the contributions of these effects on the temperature of the device inside the signal processor reveals that a factor leading to a decrease of the temperature of the device is only the vehicle air-conditioning. However, when both cooling effect of the air-conditioning and generation of heat from the device itself are taken into consideration, it is considered that the temperature of the device is always higher than the outside air temperature during vehicle traveling, i.e., the ignition switch is kept on. Moreover, when sunlight affects the temperature, the passenger compartment should be higher than the outside air temperature. It follows that the device within the signal processor affected by the temperature of the passenger compartment is higher than the outside air temperature.

More specifically, when the ignition switch is turned on plural times, the device inside the signal processor may assume different temperatures. It is conceivable that the temperature of the device has converged to the outside air temperature at one of these temperatures, or the lowest temperature. Accordingly, when the ignition switch is turned on, the temperature of device is detected as the outside air temperature, and the detected temperature is stored in memory. This operation is repeated a preset number of times. Using the lowest one of the stored values, the effects on the estimation of the tire air pressure may be corrected.

A correcting device may correct at least one of the resonant frequency, the tire spring constant, and the estimated tire air pressure based on the outside air temperature extracted by the tire temperature-associated value-extracting device.

That is, the correcting device may correct the resonant frequency or tire spring constant indicating a change in the tire air pressure or indirectly indicating the tire air pressure itself according to the tire temperature-associated value. Rather than correcting the resonant frequency or tire spring constant, the correcting device may correct the tire air pressure estimated based on uncorrected resonant frequency or tire spring constant.

Take the extracted resonant frequency as an example. The above-described correcting device calculates a corrected resonant frequency given by $$\omega' = \omega - \Delta\omega(\text{Temp}) \quad (1)$$

where $\omega$ is a resonant frequency to be corrected, Temp is information about a temperature to be detected, and $\Delta\omega$ is a value by which the resonant frequency $\omega$ is corrected based on the information about the temperature. The air pressure-estimating device estimates the air pressure inside the tire according to the calculated, corrected resonant frequency $\omega'$.

By correcting the resonant frequency or the like, the effects of the outside air temperature can be easily and precisely circumvented.

The amount of correction $\Delta\omega$ added to or reduced from the resonant frequency $\omega$ based on the information about the temperature Temp is so selected as to cancel out the effects of the outside air temperature, taking account of the following characteristics: "Even if the tire air pressure is constant, lowering of the outside air temperature hardens the rubber portion of the tire and increases the resonant frequency. Conversely, rising of the outside air temperature softens the rubber portion of the tire and lowers the resonant frequency." For this purpose, a map consisting of the aforementioned information about the temperature Temp and previously stored, corresponding amounts of correction can be used.

The present invention can also provide an apparatus for estimating tire air pressure which comprises a vibrational component output device for producing a signal including vibrational components of a tire during vehicle traveling, an extracting device for extracting a resonant frequency of the vibrational components or a tire spring constant from the produced signal including the vibrational components, and an air pressure-estimating device for estimating air pressure inside the tire from the extracted resonant frequency or tire spring constant. In addition, a tire temperature-associated value-extracting device is provided to extract a value associated with tire temperature affecting the extracted resonant frequency or tire spring constant. A decision device makes a decision based on relations between the air pressure estimated by the air pressure-estimating device and a preset decision value as to whether the air pressure is abnormal or not. Further, a correcting device is provided to correct the decision value in the decision device based on the tire temperature-associated value extracted by the tire temperature-associated value-extracting device.

When the tire air pressure is determined according to the result of the comparison with the given decision value, the accuracy with which the tire air pressure is estimated can be improved by making a correction of the decision value according to the tire temperature-associated value.

The extracting device may comprise a linear forecasting device for introducing a linear forecasting model of the vibrational component of the tire produced from the vibrational component output device to a time sequence signal including the vibrational components, identifying parameters of the introduced linear forecasting model, and extracting the resonant frequency of the vibrational components.

That is, the parameters of the linear forecasting model can be estimated by finding the correlative coefficients between time sequence signals including the vibrational components of the tire. If the parameters can be estimated in this way, the resonant frequencies in the vertical direction of the tire, in the longitudinal direction of the tire, and in the torsional direction of rotation of the tire can be found.

In this case, the linear forecasting device may comprise a parameter-identifying device for introducing a second-order forecasting model about the vibrations as given by $$y(k) = -c1y(k-1) - c2y(k-2) + m(k) \quad (2)$$

in which k is the sampling time, y(k) is a time sequence signal including the vibrational components of the tire, and m(k) is an external disturbance, and for identifying the parameters c1 and c2, and a resonant frequency calculating device for calculating the resonant frequency using the identified parameters c1 and c2.

This configuration can reduce the amount of calculation and the capacity of memory necessary for decision of the tire air pressure. Since each tire has only one resonant point depending on the air pressure, the above-described linear forecasting model is only required to be found to the "second" order.

In this case, the parameter-identifying device may identify the parameters c1 and c2 by the least squares method. This is advantageous where the identification is made efficiently.

An FFT calculating device which performs high-speed Fourier transform (FFT) on the signal including the vibrational components of the tire produced from the vibrational component output device may be provided instead of the linear forecasting device. The air pressure-estimating device may estimate the tire air pressure from the resonant frequency of a frequency spectrum obtained by FFT calculation. In this case, the amount of calculation and capacity of memory required are increased. However, the accuracy with which the tire air pressure can be estimated can be made higher than the prior art apparatus.

The present invention can also provide an apparatus for estimating tire air pressure which comprises wheel speed-detecting devices for detecting a signal indicative of a speed of each of wheels during vehicle traveling, a signal processor mounted within a housing, the signal processor comprising an extracting device for extracting a resonant frequency of the vibrational components or a tire spring constant from each wheel speed signal detected by the wheel speed-detecting devices, an air pressure-estimating device for estimating air pressures inside the tires from the extracted resonant frequencies or tire spring constants, and a decision device for making decisions based on relations of the air pressures estimated by the air pressure-estimating device to a preset decision value as to whether the air pressures are abnormal or not. In addition, a correcting device is provided to extract tire temperature-associated values affecting the extracted resonant frequencies or spring constants and correcting the decision value according to the tire temperature-associated values. A temperature-sensing device for sensing temperature inside the signal processor as outside air temperature is disposed within the housing to extract a tire temperature-associated value used in the correcting device.

The present invention can also provide an apparatus for estimating tire air pressure which comprises wheel speed detecting devices for detecting a signal indicative of a speed of each of wheels during vehicle traveling, a signal processor mounted within a housing, the signal processor comprising an extracting device for extracting a resonant frequency of the vibrational components or a tire spring constant from each wheel speed signal detected by the wheel speed detecting devices, an air pressure-estimating device for estimating air pressures inside the tires from the extracted resonant frequencies or tire spring constants, a decision device for making decisions based on relations of the air pressures estimated by the air pressure-estimating device to a preset decision value as to whether the air pressures are abnormal or not, and an anti-skid control device for controlling braking forces applied to the wheels so as to moderate tendencies of the wheels to be locked using the speeds of the wheels calculated according to the signals indicative of the wheel speeds. Further, a correcting device is provided to extract a tire temperature-associated value affecting the extracted resonant frequencies or spring constants of the tires and correcting the decision value according to the tire temperature-associated values. A temperature-sensing device for sensing temperature inside the signal processor as the outside air temperature is disposed within the housing of the signal processor to extract a tire temperature-associated value used in the correcting device.

The device for estimating or judging the tire air pressure and the device for providing anti-skid control are installed within the signal processor in this way. And, the temperature-sensing device for extracting temperatures associated with the tire temperature is also positioned within the housing of the signal processor. The estimation of the tire air pressure and anti-skid control are both provided according to signals from the common wheel speed-detecting devices. The integration of the signal processing unit for estimating or judging the tire air pressure with the signal-processing unit for providing anti-skid control permits execution of signal processing at one location. Also, the number of components can be reduced. In this case, if the temperature-sensing device for extracting tire temperature-associated values is located within the housing of the single signal processor, the same advantages can be provided as in the foregoing.

Next, a second aspect of the present invention is described to achieve the third object.

An apparatus for estimating tire air pressure according to the second aspect of the present invention, comprises a detecting device for detecting a signal including vibrational components of a tire during vehicle traveling, an extracting device for extracting a resonant frequency or a tire spring constant associated with the tire air pressure from the vibrational components detected by the detecting device, a signal processing-filter for allowing the signal including the vibrational components of a preset band of frequencies to pass in order to extract the resonant frequency or tire spring constant from the vibrational components, and an air pressure-estimating device for estimating air pressure in the tire according to the resonant frequency or tire spring constant that is extracted from the signal passing through the signal-processing filter. In particular, a shifting device is further provided to shift the frequency band of the signal passing through the signal-processing filter according to the resonant frequency or tire spring constant previously extracted by the extracting device while maintaining the width of the frequency band constant.

That is, the above-described problem is solved by adopting a filter having a narrowed pass-band capable of suppressing variations in the air pressure-detecting performance, deriving a frequency range permitting optimum and accurate detection, and shifting the pass-band of the filter according to the derived pass-band.

At this time, the frequency range permitting optimum and accurate detection may be derived as described below.

For example, the shifting device shifts the pass-band of the filter in such a manner that the previously extracted resonant frequency or spring constant, or an average value of the resonant frequencies or spring constants which are obtained by a predetermined number of extractions is brought almost into the center of the pass-band. Therefore, the signal having a narrow band of frequencies, the center of which corresponds to the resonant frequency or the frequency of the tire spring constant expressing the tire air pressure is allowed to pass through the filter. In consequence, noises can be eliminated efficiently such that the amount of the signal components expressing the resonant frequency or tire spring constant is prevented from decreasing as much as possible. Our detailed investigation has revealed that there exist many frequency components creating noises around the resonant frequency of the vibrational components dependent on the tire air pressure. Therefore, it is necessary to adopt a filter having a narrowed pass-band to suppress variations of the air pressure detection performance. As shown in FIG. 16A, when the temperature is low and the air pressure is high, noises are present outside the pass-band of the filter that is preset to from 30 to 50 Hz. Therefore, the peak of the resonant frequency in the output frequency characteristic of the filter is not truncated and so the detection accuracy is sufficiently high. On the other hand, as shown in FIG. 16B, when the ambient temperature is high and the air pressure is low, for example, the peak of the resonant frequency is located near one end of the filter, i.e., frequencies providing the greatest power spectrum of the resonant frequency. In this case, if the filter having the pass-band of from 30 to 50 Hz is used, the peak of the output frequency characteristic of the filter is moved from that of the original signal at the end of the pass-band of the filter. This causes the change of the peak of the resonant frequency. This is because many frequency components that should be preserved exist outside the pass-band of the filter. If this situation takes place, and if a true change in the resonant frequency takes place due to tire air pressure as shown in FIG. 17, the resonant frequency extracted through the filter involves an error. The present invention can deal with such issues. In particular, the resonant frequency does not change rapidly unless the tire air pressure varies rapidly (unless it is a burst or the like). Consequently, the pass-band of the filter is shifted such that the previously detected resonant frequency or the average of the results of past plural detections is brought into the center of the pass-band of the filter. Then, preparations are made for the next detection. In this way, a true change in the resonant frequency due to tire air pressure can be detected at all times. Somewhat mild variations in the air pressure due to aging or puncture can be detected precisely. The tire spring constant can be extracted in the same way as where the resonant frequency is extracted.

Also, the shifting device shifts the pass-band of the filter in such a way that the difference between the previously extracted resonant frequency or spring constant, or an average value of the resonant frequencies or spring constants which are obtained by a predetermined number of extractions and a central value of the pass-band is within a reference range. At this time, the shifting device makes a decision as to whether the difference with the center value is within the reference range, and determines whether the result of the extraction made by the extracting device may be used in the tire air pressure-estimating device. The shifting device may repeat the shift of the pass-band until the difference with the center value decreases within the reference range. Although the amount of calculation is increased compared with the case as described above, accurate detection is assured even if the resonant frequency has changed greatly by replacement of the tire.

The shifting device may shift the pass-band according to the ambient temperature. Specifically, a filter having a narrow frequency band from a frequency corresponding to a high pressure to a frequency corresponding to a low pressure at a constant temperature is adopted. This narrow frequency band is contained in a frequency range corresponding to the air pressure range to be detected, the frequency range lying from a frequency in a low-temperature, high-pressure condition to a frequency in a high-temperature, low-pressure condition. variations of the air pressure detection performance are suppressed by using the filter having the narrow pass-band. When variations in the frequency due to temperature variations take place, the pass-band of the filter is shifted by a forecasted amount of change in the frequency due to the temperature.

The shift of the pass-band may be allowed or prohibited according to system's response time in the tire air pressure-estimating apparatus.

The second aspect of the present invention can provides an apparatus for estimating tire air pressure which comprises a detecting device for detecting a signal including vibrational components of a tire during vehicle traveling, an extracting device for extracting a resonant frequency or a tire spring constant associated with the tire air pressure from the vibrational components detected by said detecting device, a signal processing-filter for allowing the signal having a preset band of frequencies to pass, an air pressure-estimating device for estimating air pressure in the tire according to the resonant frequency or tire spring constant that is extracted from the signal passing through the signal-processing filter, and a modifying device for modifying width of the pass-band of the signal processing filter.

In particular, when it is necessary to roughly find the value of the resonant frequency or spring constant of the vibrational components dependent on the tire air pressure, the width of the pass-band is increased. When it is necessary to accurately find the value of the resonant frequency or spring constant of the vibrational components dependent on the tire air pressure, the width of the pass-band is narrowed. This makes it possible to estimate the tire air pressure accurately.

The modifying device may modify the width of the pass-band of the signal-processing filter according to at least one of intensity of the signal previously passing through said signal-processing filter, vehicle speed, and the resonant frequency or tire spring constant extracted by the extracting device in the past. That is, the width of the pass-band of the filter is optimized according to the circumstances to suppress variations in the air pressure detection performance. For example, even though a slight amount of noise is present near the resonant frequency of the vibrational components dependent on the tire air pressure, if the intensity of the signal of the resonant frequency of the vibrational components is sufficiently large, the resonant frequency can well be detected. Therefore, in this case, the width of the pass-band is increased. In the reverse case, the width is decreased. The relation between the signal intensity of the resonant frequency of the vibrational components dependent on the tire air pressure and the signal intensity of noise (S/N) depends on the vehicle speed. Therefore, the width of the pass-band of the filter may be varied according to the vehicle speed. The frequencies at which some noises are generated are determined by the kind of vehicle. Therefore, when the frequency band of the resonant frequency of the vibrational components is close to the frequencies at which the noises are generated, the width of the pass-band of the filter may be narrowed. In the reverse case, the width may be broadened.

The modifying device may vary the width of the pass-band of the filter according to system's response time in the tire air pressure-estimating apparatus. When a filter has a frequency range covering the air pressure range to be detected, i.e., a wide pass-band from a frequency under a low-temperature, high-pressure condition to a frequency under a high-temperature, low-pressure condition, quick detection is permitted although the accuracy is poor. Conversely, when the pass-band of the filter is narrowed as mentioned previously, it takes a long time to find the optimum state of the width of the pass-band although the detection accuracy is high. In view of them, the width of the pass-band may be varied according to the system's request time. For example, when an initial decision should be made immediately after the ignition switch of the vehicle is turned on, the pass-band of the filter is widened. As a result, the resonant frequency of the vibrational components dependent on the tire air pressure is roughly detected. In this way, priority is given to the computational time and to the response time rather than the detection accuracy. During later detection, for example, the pass-band of the filter is slowly narrowed to obtain an optimum filter pass-band. As a result, detection is effected with high response while maintaining the accuracy to some extent. In this way, the width of the pass-band of the filter may be switched between the case where greater importance is placed on the response of the system than the accuracy and the case where greater importance is placed on the accuracy of detection than the response. Hence, the tire air pressure can be estimated by a method best matching the requirement.

The shifting device may shift the pass-band of the filter only when vehicle speed or intensity of a signal passing through the signal-processing filter satisfies a predetermined condition (for example, greater than a reference value).

In particular, when the signal intensity of the resonant frequency dependent on the tire air pressure is not sufficiently large, the relative effects of noises at frequencies close thereto are large. As a result, the detection of the resonant frequency tends to produce errors. If the pass-band of the filter is shifted without taking account of the signal intensity, there exists a possibility of moving the pass-band into an incorrect frequency range. Therefore, if the pass-band is shifted according to the signal intensity while taking noise effects into consideration, more accurate estimation of the air pressure can be achieved.

The second aspect of the present invention can also provide an apparatus for estimating tire air pressure which comprises a detecting device for detecting a signal including vibrational components of a tire during vehicle traveling, an extracting device for extracting a resonant frequency or a tire spring constant associated with the tire air pressure from the vibrational components detected by the detecting device, a signal processing-filter for allowing the signal having a preset band of frequencies to extract the resonant frequency or tire spring constant from the signal passing therethrough, an air pressure-estimating device for estimating air pressure in the tire based on the resonant frequency or tire spring constant that is extracted from the vibrational components of the signal passing through the signal-processing filter, an a shifting-and-modifying device for shifting a frequency pass-band of the signal-processing filter according to the resonant frequency or tire spring constant previously extracted by the extracting device and for modifying width of the pass-band of the signal-processing filter.

That is, a modification of the width of the pass-band and its shift are both carried out. At this time, the width of the pass-band is modified (increased) first and then a shift thereof is made. In this way, the accuracy of detection of the resonant frequency can be improved by a shift of the pass-band after the resonant frequency is temporarily extracted by a modification of the width. In consequence, the accuracy is enhanced while the response time of the estimation of the tire air pressure can be shortened.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 31 is a flowchart illustrating control processing of a thirteenth embodiment.

DETAILED DESCRIPTION OF THE EMBODIMENTS

Embodiments of the tire air pressure-estimating apparatus according to the present invention are hereinafter described with reference to the accompanying drawings.

(First Embodiment)

An apparatus in accordance with a first embodiment is designed to detect the resonant frequency of each of wheel speeds and to make a decision, based on the resonant frequency, as to whether the actual tire air pressure is lower than a lower limit.

As mentioned previously, a relation holds between the air pressure in a tire and the resonant frequency of the tire. That is, as the tire air pressure becomes lower, the resonant frequency becomes lower. Further, torsional vibration in the direction of rotation of the tire is contained in a wheel speed signal. The torsional vibration is detected as the resonant frequency or the spring constant of the tire, based on the wheel speed signal. A predetermined relation holds between the tire air pressure and the resonant frequency included in the wheel speed signal. That is, as the tire air pressure becomes lower, the resonant frequency included in the wheel speed signal decreases.

Figure 3:
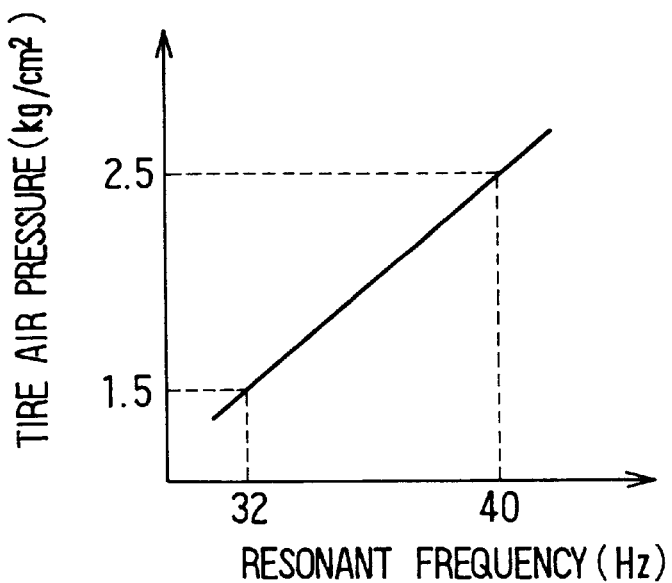
FIG. 3 is a characteristic map showing the relation between tire air pressure and resonant frequency.

Accordingly, in the apparatus according to the first embodiment, the tire air pressure is estimated from a map describing the relation between the tire air pressure and the resonant frequency estimated from the wheel speed signal as shown in FIG. 3. A decision is made as to whether the estimated tire air pressure is lower than the lower limit affecting the operation of this vehicle.

Figure 1:
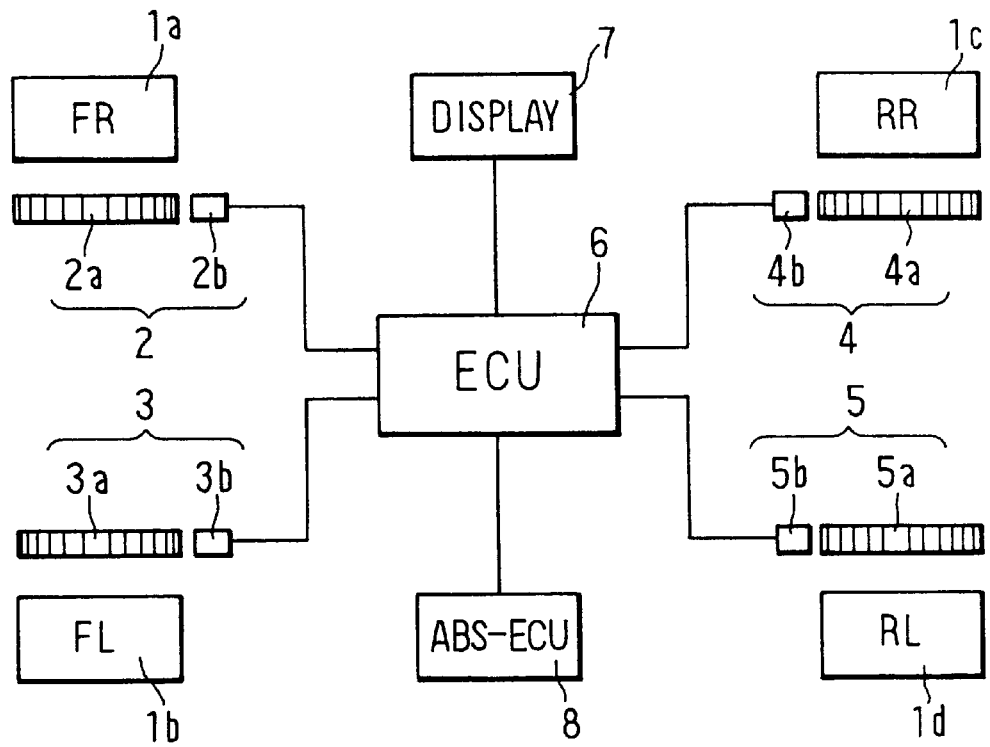
FIG. 1 is a block diagram showing the configuration of a tire air pressure-estimating apparatus according to a first embodiment of the present invention.

As shown in FIG. 1, wheel speed sensors 2–5 are mounted on the vehicle, corresponding to tires 1a–1d of the vehicle. The wheel speed sensors 2–5 comprise rotors 2a–5a and pickup coils 2b–5b, respectively. The rotors 2a–5a are mounted coaxially with rotating shafts (not shown) of the tires 1a–1d, respectively. The rotors 2a–5a are made of disks of a magnetic substance.

The pickup coils 2b–5b produce AC signals having periods according to the rotational speeds of the rotors 2a–5a, i.e., the rotational speeds of the tires 1a–1d, respectively.

AC signals produced from the pickup coils 2b–5b are applied to a well-known electronic controller (hereinafter referred to as ECU) 6 including a microcomputer 600 and a waveform-shaping circuit. The microcomputer 600 is composed of a CPU 601, ROM 602, and RAM 603. The AC signals produced by the pickup coils 2b–5b undergo certain signal processing including waveform shaping. This ECU 6 corresponds to the signal processor.

The results of this signal processing are sent to a display portion 7 to inform the driver of the states of the air pressures in the tires 1a–1d. This display portion 7 may show the states of the air pressure in the tires 1a–1d separately. The display portion 7 may consist of one warning lamp to inform the driver that the air pressure in any one of the tires 1a–1d has decreased below the lower limit (of a reference air pressure range).

A reference number 8 represents an electronic controller for performing anti-skid control and/or traction control. As described later, the electronic controller 8 receives data of the air pressures of the tires and utilizes it in anti-skid control and/or traction control.

Figure 2:
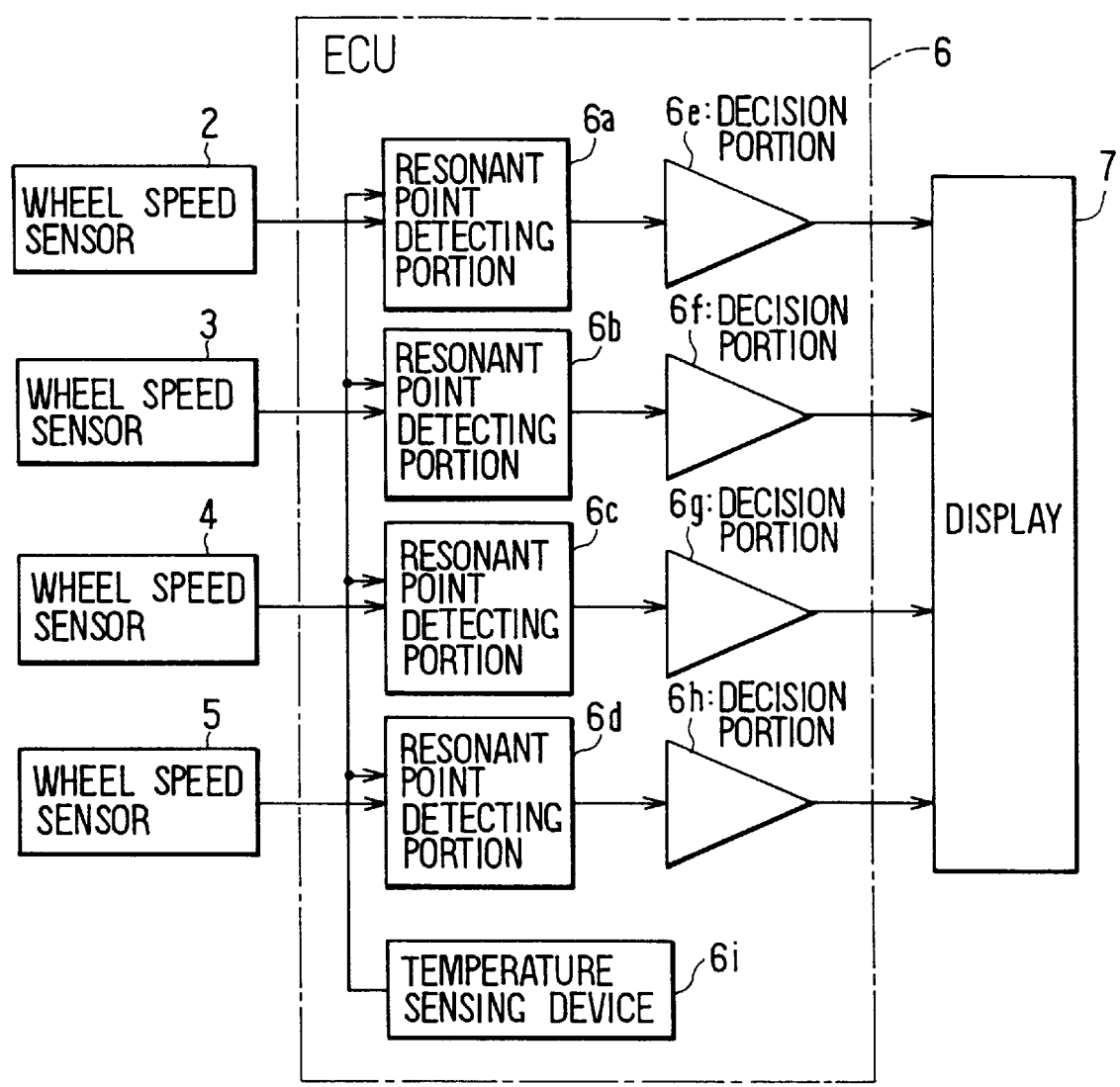
FIG. 2 is a block diagram showing the electronic configuration of a tire air pressure-estimating apparatus of the first embodiment.

The operation of the ECU 6 is described by referring to FIG. 2. The ECU 6 makes a decision based on the outputs (wheel speed signals) from the wheel speed sensors 2–5 and the output (a signal corresponding to a tire temperature-associated value) from a temperature-sensing device 6i as to whether the tire air pressures of the wheels are abnormal or not. Also, the ECU 6 produces a drive signal to the display portion 7.

As shown in FIG. 2, the ECU 6 comprises resonant point-detecting portions 6a–6d for detecting the resonant frequencies of the tires based on the wheel speed signals from the wheel speed sensors 2–5 and the outside air temperature signal from the temperature-sensing device 6i, decision portions 6e–6h for making decisions based on the detected resonant frequencies as to whether the air pressures in the tires are abnormal or not, and the temperature-sensing device 6i.

Figure 4:
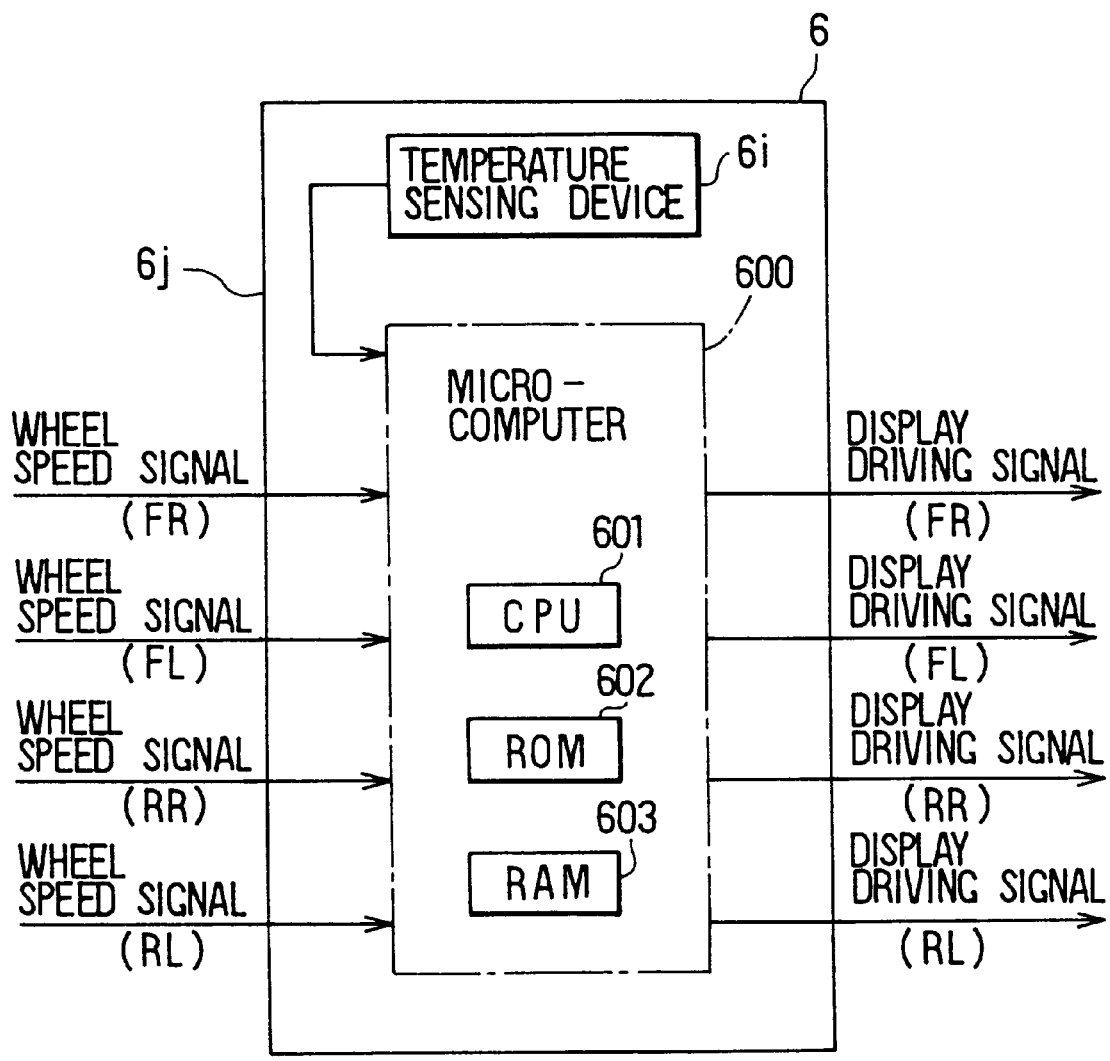
FIG. 4 is a block diagram schematically showing the configuration of a signal processor in the tire air pressure-estimating apparatus.

As shown in FIG. 4, the ECU 6 has a microcomputer 600 and realizes the functions of the resonant point-detecting portions 6a–6d and the functions of the decision portions 6e–6h by making use of the arithmetical functions of the microcomputer. As is well known, this microcomputer 600 comprises a CPU 601 that is an arithmetic processing portion, a ROM 602 mainly used as a program memory, and a RAM 603 used as a data memory.

The microcomputer 600 and temperature-sensing device 6i are integrally covered by a housing 6j forming the contour of the ECU 6.

The signal processing executed by the ECU 6 is next described in detail. First, the fundamental principle of estimation of the resonant frequencies is described, the estimation being made in the resonant frequency-calculating portions 6a–6d of the ECU shown in FIG. 2, based on the wheel speed signals.

Figure 5:
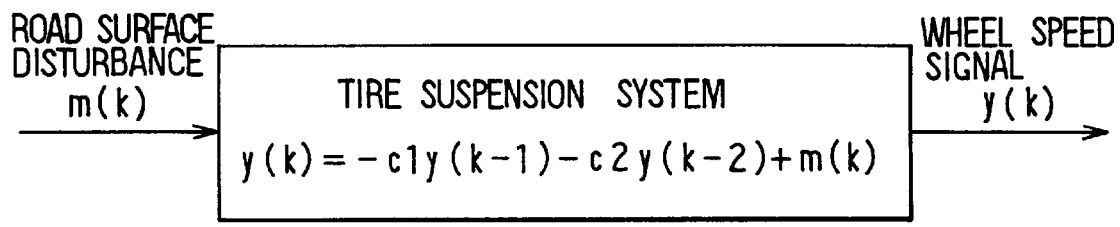
FIG. 5 shows a physical model with respect to vibrations of a tire/suspension system.

A physical model of estimation of tire air pressure can be expressed as shown in FIG. 5.

That is, road surface disturbance m(k) that is white noises is applied as an input to the tire/suspension system. As a result, the wheel speed signal y(k) is produced. At this time, the wheel speed signal y(k) includes resonant frequency components dependent on the tire air pressure. Instead of the road surface disturbance m(k), brake fluid pressure vibrations created by turning on and off a solenoid valve (duty control of the solenoid valve) may be transmitted from the brake system of the wheel to the tire on the wheel via the wheel cylinder. In this case also, external vibrations for inducing resonance vibration of the tire are applied to the tire.

In the tire air pressure-estimating apparatus in accordance with the first embodiment, the tire/suspension system is approximated by a linear forecasting model. The parameters of the model are identified by the least squares method. Assuming that there exists one resonant point dependent on the air pressure for each tire, it is only necessary that this linear forecasting model be approximated up to the "second" order. This can minimize the amount of calculation and the capacity of data memory (RAM 603) necessary for the ECU 6.

As shown previously, a second-order discrete time model can be given by $$y(k) = -c1 \cdot y(k-1) - c2 \cdot y(k-2) + m(k) \qquad (2)$$

where k is a sampling time, m(k) is road surface disturbance, and y(k) is the wheel speed signal as described above.

The unknown parameters c1 and c2 are identified, using finite number of observed data items y(k). In this example, these unknown parameters c1 and c2 are identified by the least squares method.

More specifically, let θ be a parameter vector. Let z be an observed value vector. We define the following two-dimensional vectors:

$$\theta = \begin{pmatrix} -c1 \\ -c2 \end{pmatrix} \qquad (3)$$

-continued $$z(k) = \begin{pmatrix} y(k-1) \\ y(k-2) \end{pmatrix} \quad (4)$$

Thus, Eq. (2) above can be rewritten as $$y(k)=Z^T(k)\theta+m(k) \quad (5)$$

As mentioned previously, m(k) included in Eq. (5) is road surface disturbance and can be regarded as white noises. Estimation of the unknown parameters by the least squares method is made by finding such a value of Eq. (3) that minimizes a performance function represented by $$J = \sum_{k=1}^{N} m^2(k) \quad (6)$$

According to the batch-type least squares method, the estimated value of Eq. (3) that minimizes Eq. (6) can be given by $$\hat{\theta} = \left[\sum_{k=1}^{N} z(k)z^T(k)\right]^{-1} \sum_{k=1}^{N} z(k)y(k) \quad (7)$$

For example, see "Introduction to Robust Adaptation Control", by Mikio Kanai, Ohm Publishing Company, and "Introduction to System Identification", System Control Information Library 9, by Toru Katayama, Asakura Publishing Company.

The resonant frequency w is found from the c1 and c2 identified in this way.

Letting T be the sampling interval, the relation among the parameters c1 and c2 of the second-order discrete time model, the resonant frequency ω, and an attenuation coefficient ζ are given by the following Eqs. (8) and (9):

$$c1 = -2c^{2\pi\zeta\omega T}\cos\left(2\pi\omega\sqrt{1-\zeta^2}\,T\right) \quad (8)$$

$$c2 = c^{-4\pi\zeta\omega T} \quad (9)$$

Therefore, the resonant frequency ω and the attenuation coefficient ζ can be computed, using the following Eqs. (10) and (11):

$$\omega = \frac{1}{2\pi T}\sqrt{\left(\frac{\log c2}{2}\right)^2 + \left(\cos^{-1}\left(-\frac{c1}{2\sqrt{c2}}\right)\right)^2} \quad (10)$$

$$\zeta = -\frac{1}{4\pi\omega T}\log c2 \quad (11)$$

As mentioned previously, the resonant frequency ω found from Eq. (10) is affected by a tire temperature-associated value (e.g., the outside air temperature) and so it is necessary to correct its effects.

The temperature-sensing device 6i mounted in the ECU 6 is a means for deriving a tire temperature-associated value. The principle on which the outside air temperature is estimated using the temperature-sensing device 6i is next described by referring to FIG. 6.

Figure 6:
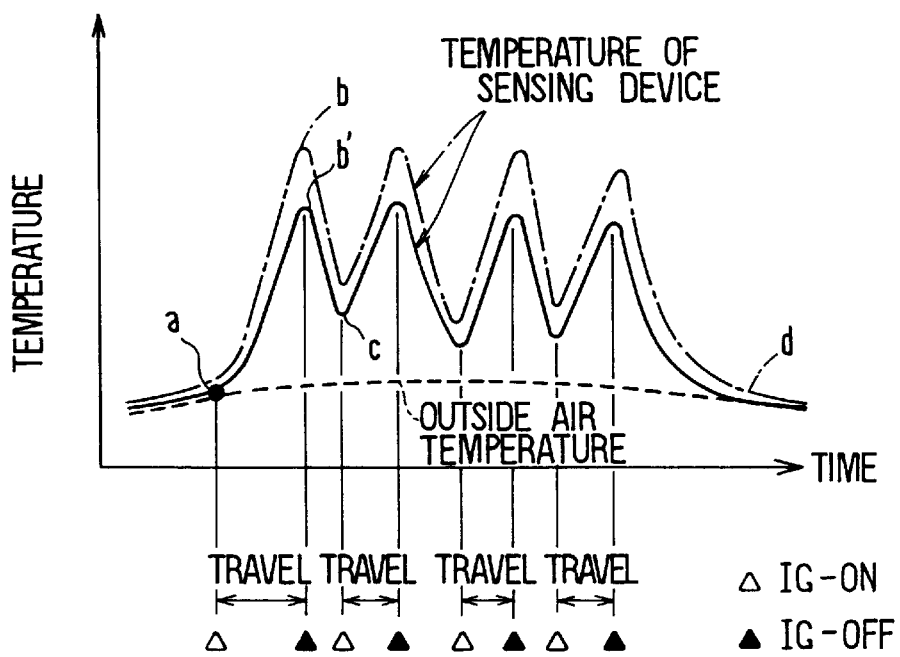
FIG. 6 is a characteristic diagram illustrating the chance that outside air temperature agrees with the temperature of a passenger compartment or with the temperature of a device disposed in the signal processor.

FIG. 6 schematically shows the relation between the outside air temperature and the temperature of the temperature-sensing device 6i mounted in the ECU 6 when the vehicle assumes a typical daily running pattern. In this case, the most frequently encountered situation is considered. Before the ignition switch (IG) is first turned on, the vehicle is kept inoperative for a sufficiently long time. Then, the engine is started responsive to the ignition switch turned on. Under this condition, it can be considered that the temperature of the temperature-sensing device 6i mounted in the ECU 6 is the same as the temperature of the passenger compartment because the device 6i does not generate heat by energization and because the history of temperature does not affect the device.

The relation between the temperature of the passenger compartment of this vehicle and the outside air temperature is discussed. It can be considered that when the effects of sunlight are small, the temperature of the passenger compartment is nearly equal to the outside air temperature. Because the temperature of the temperature-sensing device 6i is the same as the temperature of the passenger compartment, and because the temperature inside the passenger compartment is identical with the outside air temperature, the temperature of the temperature-sensing device 6i is equal to the outside air temperature at time point a, at which the outside air temperature can be estimated from the temperature-sensing device 6i. The vehicle is started by turning on the ignition switch (IG) under the above-described condition. This start is hereinafter referred to as "cold start."

When the ignition switch (IG) is turned on and the vehicle is started as shown in FIG. 6, the temperature-sensing device 6i mounted in the ECU 6 reaches a temperature b at which the temperature raised by heat generated by the energized temperature-sensing device 6i is at balance with the temperature of the surrounding passenger compartment. When the surroundings are cooled by an air conditioner, this balance point b moves into a lower point b'.

If the ignition switch (IG) is turned off and the vehicle comes to a stop, the temperature-sensing device 6i is deenergized. The temperature of the temperature-sensing device 6i begins to drop to a point c.

When normal usage of the vehicle is considered, however, the vehicle stop period is not always long enough to annihilate the temperature history of the temperature-sensing device 6i. Sometimes, the ignition switch is turned on again during cooling and the vehicle is started as indicated by the point c. The time point a is obtained when the ignition switch is first turned on as shown in FIG. 6. The point c is also obtained when the ignition switch is turned on for the second time in FIG. 6.

In this way, the temperature of the temperature-sensing device 6i mounted inside the ECU 6 converges back to the outside air temperature and reaches a point d while affected by the period for which the ignition switch is kept off, the radiant heat, and the operating condition of the air conditioner.

Thus, it can be said from the viewpoint of usage of the vehicle that there always exists a time when the temperature of the temperature-sensing device 6i mounted in the ECU 6 agrees with the outside air temperature as indicated by the point a as illustrated in FIG. 6.

In FIG. 6, the temperature of the temperature-sensing device 6i converges to the outside air temperature at the point a. After the ignition switch is turned on, heat is generated by the energization of the device 6i. This produces noise in estimating the outside air temperature. Estimating the outside air temperature after the point a is undesirable. Accordingly, it is necessary to read the temperature of the temperature-sensing device 6i just when the ignition switch is turned on.

When the ignition switch (IG) is turned on, convergence of the temperature of the temperature-sensing device 6i to the outside air temperature as indicated by the point a has not always taken place. Sometimes, the temperature history still lingers as indicated by the point c. Because the outside air temperature can be estimated only at the point a, to assure that this point a is detected, it is necessary to preset the number of times the ignition switch (IG) is turned on. Appropriate selection of this preset number of times ensures the detection of the point a, that is, at least one chance that the outside air temperature agrees with the temperature of the temperature-sensing device.

This preset number of times is meaningless in a long term where the outside air temperature is varied by seasonal changes. To prevent the outside air temperature from being varied due to seasonal changes, the preset number of times is set with respect to a term of a few or several days. As a result, at least one cold start is assured among the plural detections of the ignition switch turned on.

The point a to which the temperature of the temperature-sensing device 6i converges to the outside air temperature and the temperature of the device 6i at other times are discussed. Essentially, the temperature of the temperature-sensing device 6i is higher than the surrounding temperature, or the temperature of the passenger compartment, because the device 6i produces heat by itself during energization. This device 6i is cooled when the air conditioner is in operation. As described above, the temperature of the temperature-sensing device 6i is detected only the instant the ignition switch is turned on. Therefore, it can be said that the cooling effect of the air conditioner hardly affects the temperature of the device 6i.

This leads one to consider that when the ignition switch is turned on plural times and the detected temperatures of the temperature-sensing device 6i are still affected by the temperature history, the detected temperatures are always higher than the temperature of the passenger compartment. On the other hand, when the temperature of the temperature-sensing device 61 has converged to the outside air temperature, the lowest temperature should take place among the temperatures of the device 61 detected plural times.

Hence, the outside air temperature can be estimated from the temperature of the temperature-sensing device 6i mounted in the ECU 6 by taking the lowest one of the temperatures detected in this way as the outside air temperature.

Figure 7:
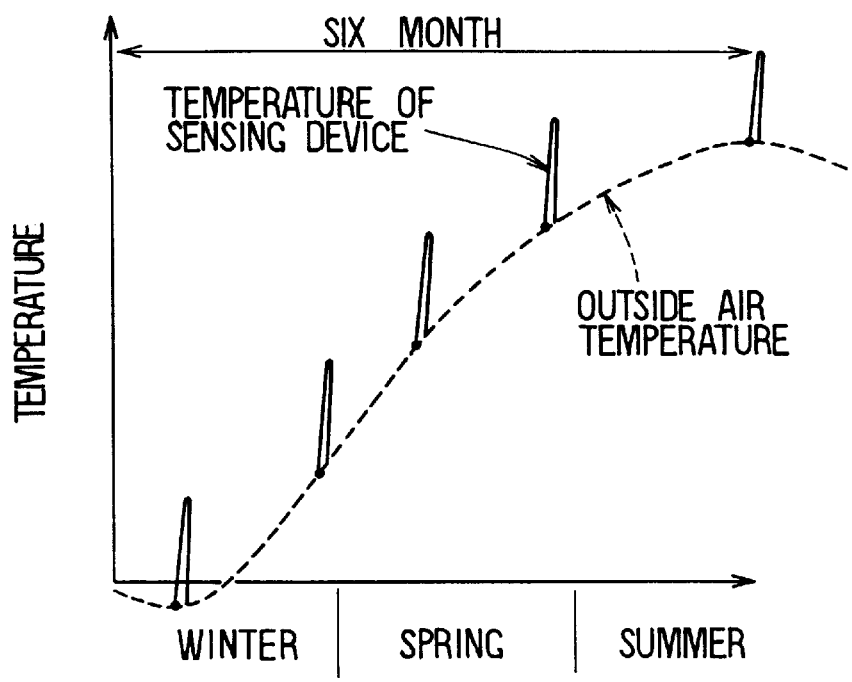
FIG. 7 is a long-term characteristic diagram illustrating the chance that outside air temperature agrees with the temperature of the passenger compartment or with the temperature of the device disposed in the signal processor.

FIG. 7 is similar to FIG. 6, but drawn on a semiannual scale.

Estimation of the tire air pressure is affected most greatly by seasonal variations of the outside air temperature. If the outside air temperature can be estimated at the point a in FIG. 6, the seasonal variations of the outside air temperature can be estimated. This improves the accuracy with which the tire air pressure is estimated.

Figure 8:
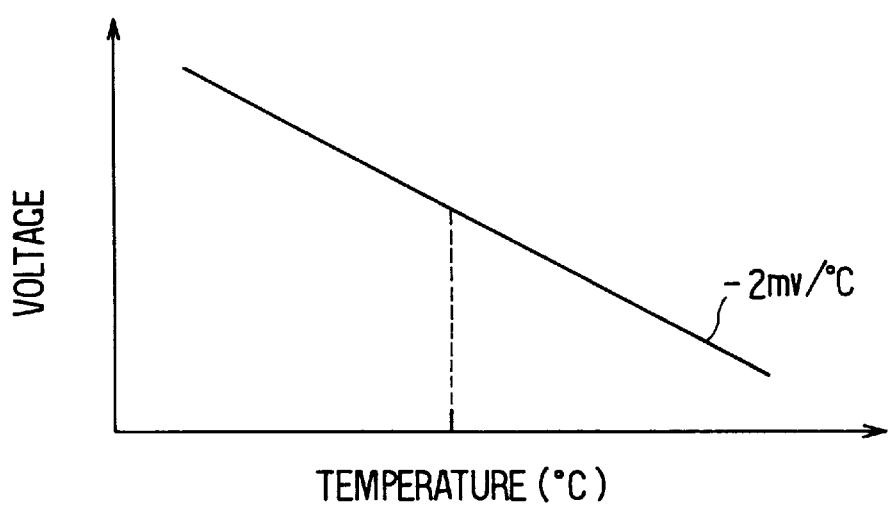
FIG. 8 is a characteristic diagram showing changes in physical properties of a diode.

FIG. 8 shows the output characteristics of a generally known semiconductor device consisting of a diode. This is one example of the temperature-sensing device 6i mounted in the ECU 6. As shown in FIG. 8, the semiconductor device exhibits excellent linearity and its cost is relatively low.

A specific example of processing for estimating the air pressure by a tire air pressure-estimating apparatus in accordance with the first embodiment is described by referring to the flowchart, which illustrates the contents of control processing of the ECU 6. Since the ECU 6 performs similar processing for all of the tires 1a–1d, the flowchart given below describes only the processing regarding the tire 1a.

Figure 9:
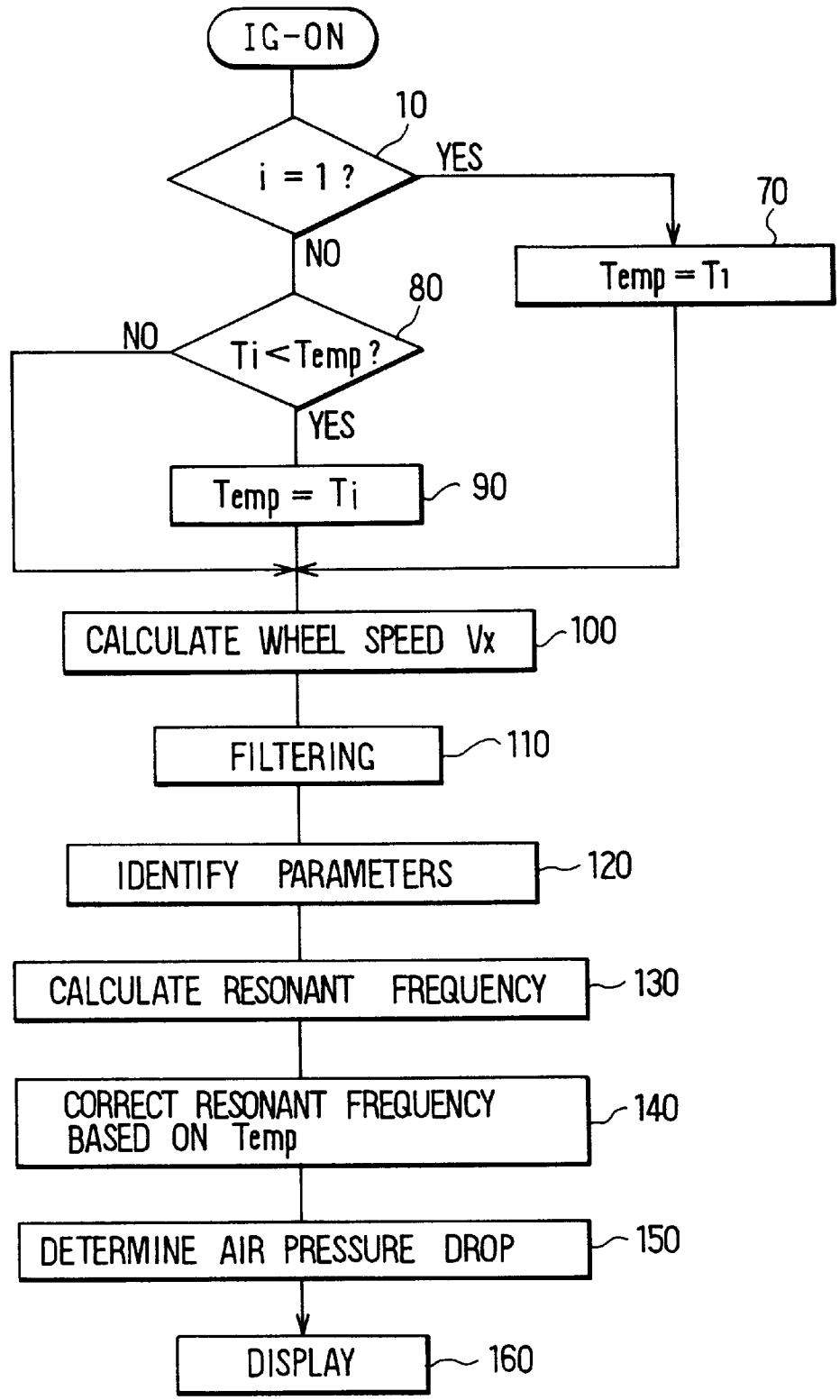
FIG. 9 is a flowchart illustrating control processing according to the first embodiment of the present invention.

FIG. 9 is a flowchart illustrating an example of method of correcting the resonant frequency or tire spring constant based on a tire temperature-associated value (e.g., an estimated value of the outside air temperature).

When the ignition switch of the vehicle is turned on, this processing is started. First, at step 10, it is determined whether the number of times the ignition switch is turned on is "1".

If the result of the decision made in step 10 is that the number of times the ignition switch is turned on is "1", control processing goes to step 70. At step 70, the temperature of the temperature-sensing device 6i mounted in the ECU 6 is read as the estimated outside air temperature Temp. That is, this temperature observed when the ignition switch is turned on for the first time is set as the estimated outside air temperature Temp.

If the result of the decision made in step 10 is that the number of times the ignition switch is turned on is two or more, control processing goes to step 80. At step 80, if the outside air temperature Ti observed when the ignition switch is turned on at this time is determined to be lower than the previously estimated value Temp of the outside air temperature, control processing proceeds to step 90. At step 90, this observed value Ti of the outside air temperature is read in as the estimated value Temp of the outside air temperature to replace the old estimated value with the new one.

If the result of the decision made in step 80 is that the outside air temperature Ti observed at this time is not lower than the previously estimated value Temp of the outside air temperature, the estimated value Temp is not updated. In this way, the lowest one of the estimated temperatures of the outside air temperature when the ignition switch is turned on n times is found. For example, n may be set to approximately 5 to 10. For each individual vehicle, an estimated average number of times the ignition switch is turned on from a long deactivation of the ignition switch to a next long OFF state of the ignition switch may be set as the reference number of times n. The vehicle may be operated to go for a drive or for purchasing in the intervening period between these two long periods of OFF state of the ignition switch.

In step 100, a pulse signal produced by wave-shaping the AC signal from the pickup coil 2b is read in. The pulse length is divided by the pulse duration. The wheel speed Vx is independently calculated for each wheel.

As illustrated in the flowchart, the resonant frequency or spring constant of the tire is calculated by the following linear forecasting method using Eqs. (2)–(11) described above.

In step 110, a narrow band-pass filter (hereinafter referred to as the band-pass filter) having a preset frequency passband about from 30 to 50 Hz or about from 60 to 90 Hz relatively accentuates the intensities of vibrational frequency components used to estimate tire air pressure, for extracting these vibrational frequency components of the wheel speed calculated in step 100.

The wheel speed signal passing through the band-pass filter is the wheel speed signal y(k), or Eq. (2), defined in the description of the principle.

The parameter-identifying step 120 identifies the parameters c1 and c2 of the above-described discrete time model from the wheel speed signal y(k) extracted by the bandpass filter 110, using Eq. (7) described above.

In a resonant frequency converter step 130, a resonant frequency $\omega 1$ is calculated from the parameters c1 and c2, using Eq. (10) defined in the description of the principle.

In step 140, the resonant frequency $\omega 1$ calculated in step 130 is corrected with the aforementioned estimated value Temp of the outside air temperature. This estimated value Temp used for correction of the resonant frequency ω1 is the minimum value of estimated outside air temperatures measured immediately after the ignition switch is turned on n times. As described previously, the calculated resonant frequency ω1 is affected by the outside air temperature as shown in FIG. 10 even if the tire air pressure is uniform.

Figure 10:
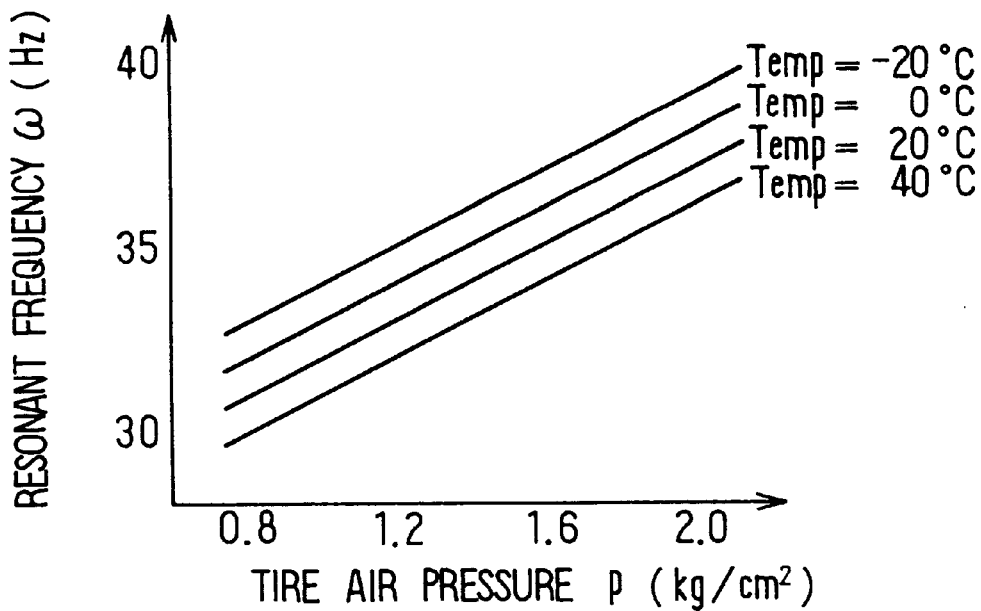
FIG. 10 is a characteristic diagram showing a resonant frequency varying dependent on the outside air temperature.

More specifically, as shown in FIG. 10, as the outside air temperature T goes lower, the resonant frequency ω increases for the same air pressure. We consider that as the outside air temperature T becomes lower, the rubber portion of the tire (especially, the tire sidewall) hardens, increasing the spring constant thereof.

Figure 11:
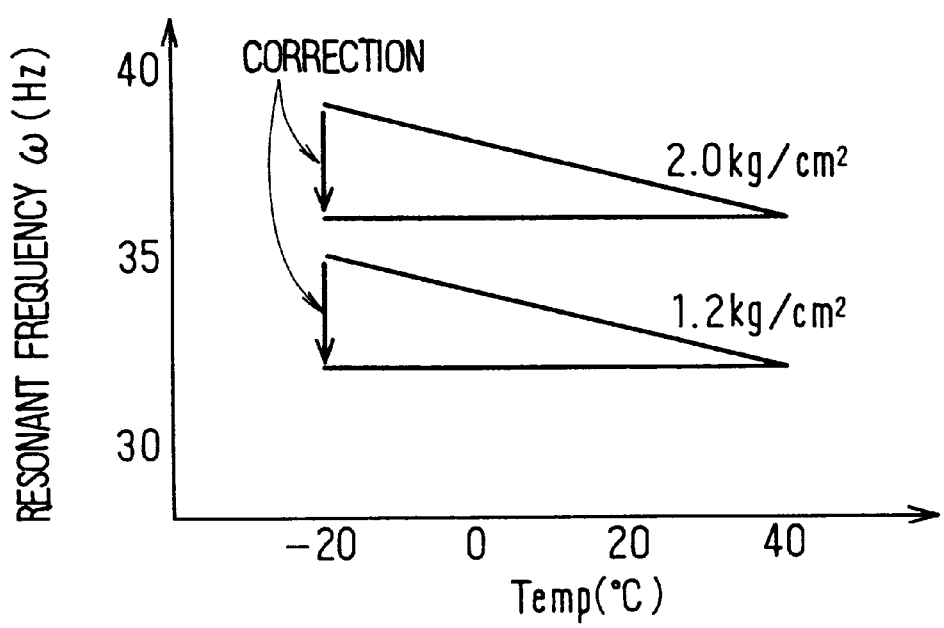
FIG. 11 is a graph showing the manner in which the resonant frequency is corrected responsive to the outside air temperature.

Accordingly, in order to prevent the accuracy of detection of the resonant frequency ω from being deteriorated due to the outside air temperature, it is necessary to correct the resonant frequency ω in response to the outside air temperature Temp (FIG. 11).

Figure 12:
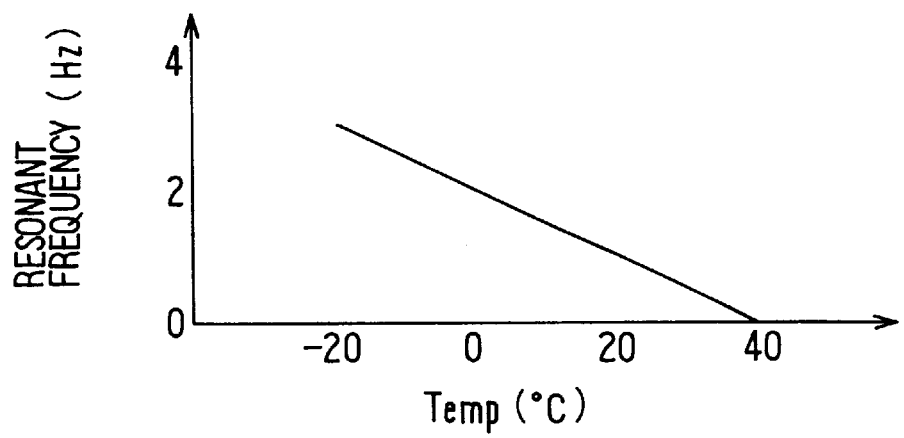
FIG. 12 is a graph showing the amount of correction by which a resonant frequency is corrected responsive to the outside air temperature.

For this purpose, a correcting map as shown in FIG. 12 is stored in the resonant frequency-correcting portion. The calculated resonant frequency ω1 is corrected according to this correcting map (step 140).

Let Δω be the amount of correction added to the resonant frequency ω as a function of the outside air temperature Temp estimated in step 90. At this time, the corrected resonant frequency (ω' can be given by $$\omega'=\omega-\Delta\omega \quad (12)$$

In the next step 150, a decision is made as to whether the air pressure in the tire is abnormal or not, based on the result of a comparison of the calculated, corrected resonant frequency ω' with a preset decision value. This is used as a threshold value in determining whether air pressure drop is abnormal or not.

In an air pressure drop-determining step 150, it is determined whether the air pressure in each individual tire is abnormal. If the result of the decision is that the air pressure has dropped abnormally, at step 160, a warning lamp in the display unit 7 shown in FIG. 1 is activated, thus informing the driver of this air pressure drop.

Four light emitting portions (for example, light emitting diodes) can be mounted to indicate abnormality of the air pressures inside the four tires separately. only one light emitting portion can be lit up to inform the driver that any one of the tires is abnormal.

Figure 13:
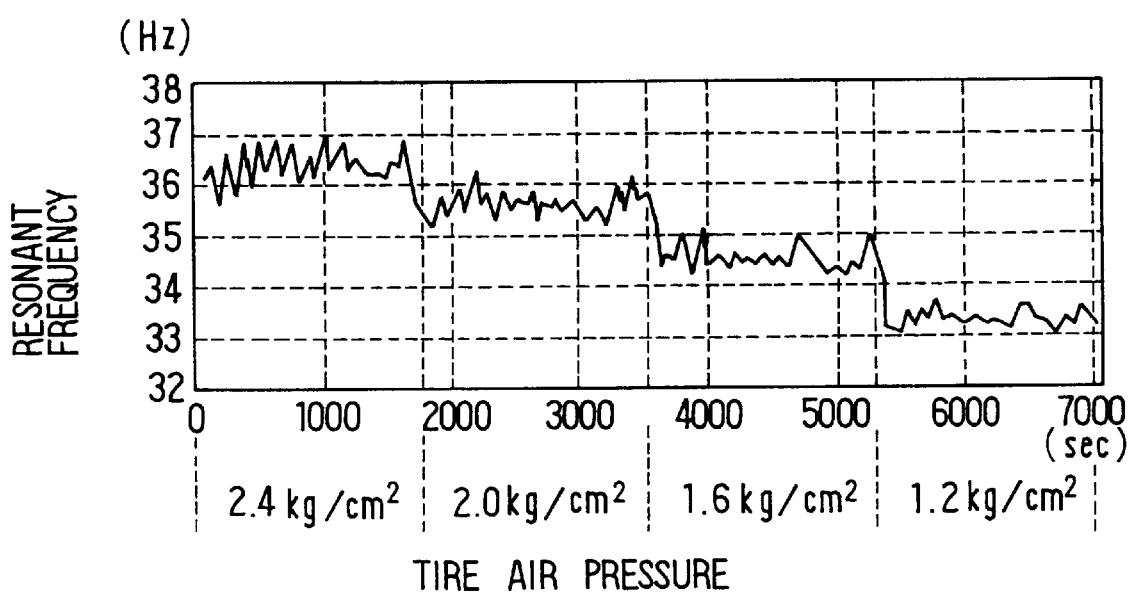
FIG. 13 is a characteristic diagram showing the relation between a resonant frequency and a tire air pressure.

For reference, resonant frequencies of tires calculated by the tire air pressure-estimating apparatus in accordance with the first embodiment are shown in FIG. 13. It can be seen that the estimated tire resonant frequency changes in an almost linear relation to the tire air pressure.

(Second Embodiment)

In the embodiment described thus far, vibrational frequency components are extracted from the wheel speed signal. The resonant frequency or tire spring constant used for estimation of the tire air pressure is corrected based on a tire temperature-associated value (e.g., outside air temperature). In a second embodiment, a decision value is used in making a decision based on the calculated tire resonant frequency or tire spring constant as to whether the tire air pressure is abnormal or not, and this decision value is corrected based on a tire temperature-associated value (e.g., outside air temperature).

Figure 14:
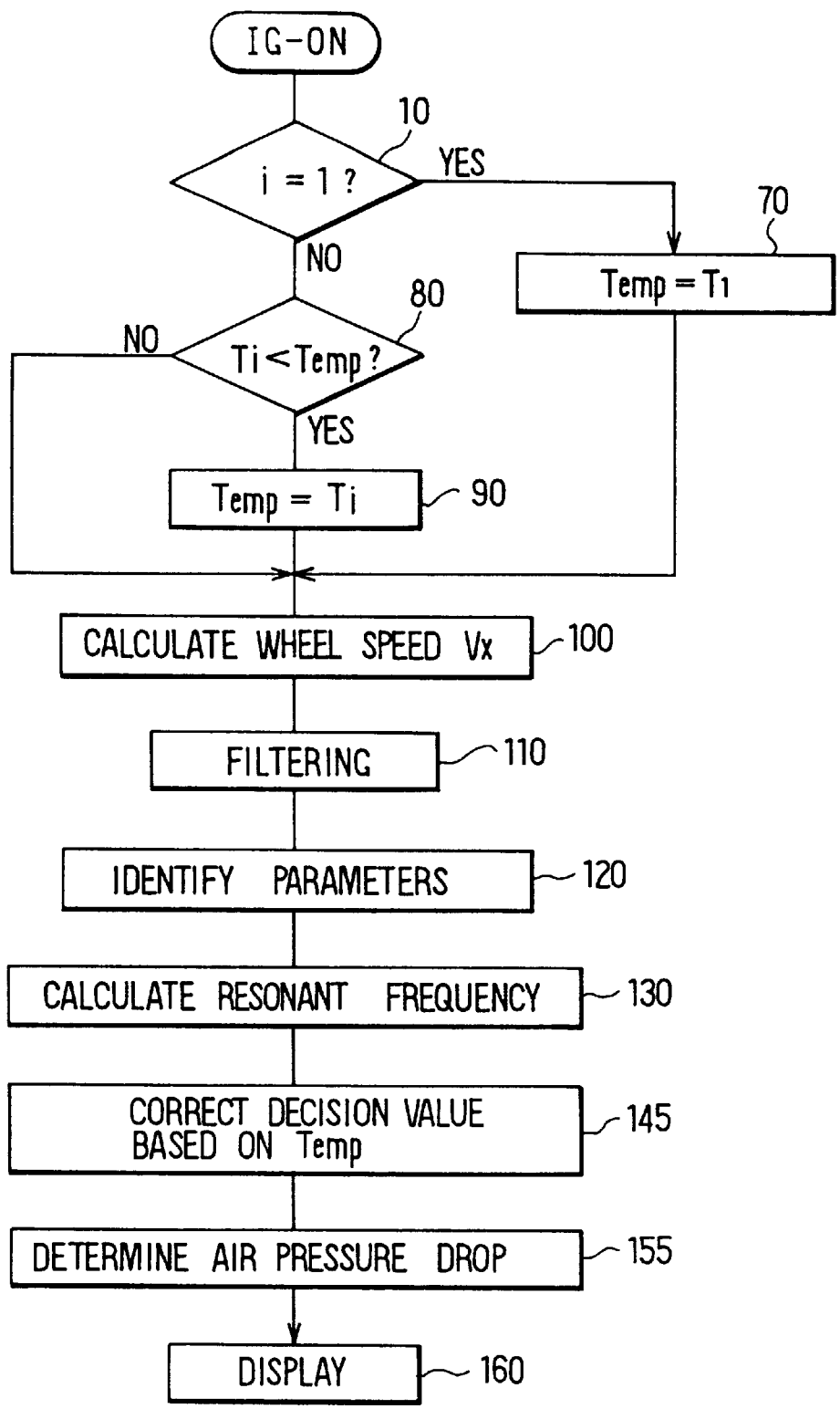
FIG. 14 is a flowchart illustrating control processing according to a second embodiment of the present invention.

A flowchart for this second embodiment is illustrated in FIG. 14.

The contents of steps from step 10 to step 130 for calculating the resonant frequency ω1 are the same as the contents of the processing of the above-described first embodiment and thus are omitted here.

In step 145, a decision value ωk used for determining a tire air pressure decrease is corrected based on the outside air temperature Temp estimated in step 90. Let Δωk be the amount of correction with respect to the decision value ωk. A corrected decision value ωk' used for determining a tire air pressure decrease is given by Eq. (13).

$$\omega k'=\omega k+\Delta\omega k \quad (13)$$

Figure 15:
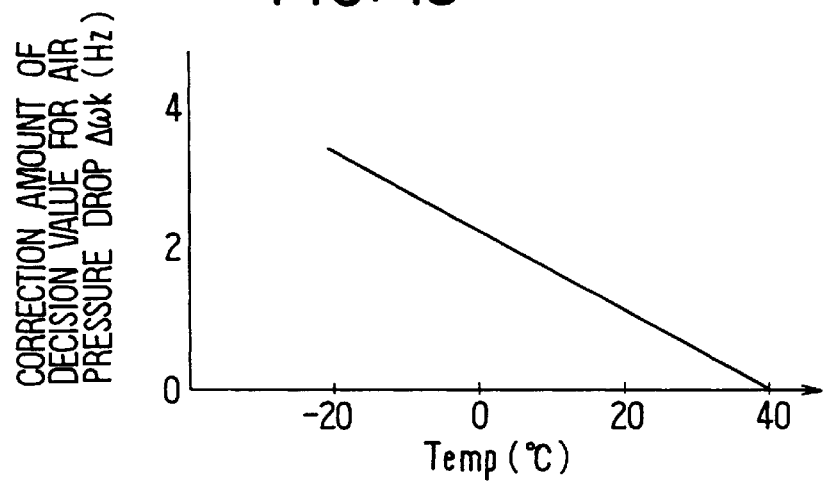
FIG. 15 is a graph showing the amount of correction by which a resonant frequency is corrected responsive to the outside air temperature.
Figure 16A:
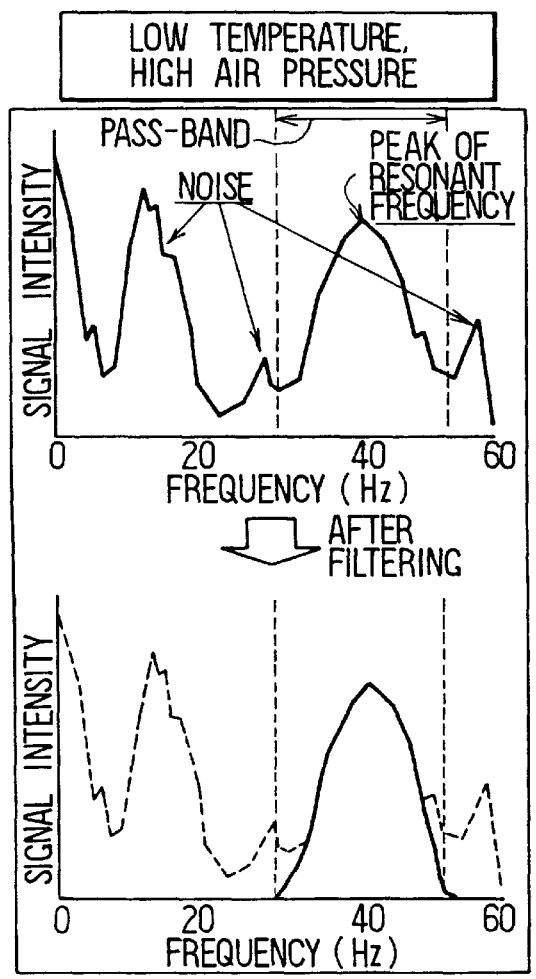
FIGS. 16A and 16B are characteristic diagrams showing the waveforms of signal intensities of frequency components dependent on tire air pressure before and after passage through a filter.
Figure 16B:
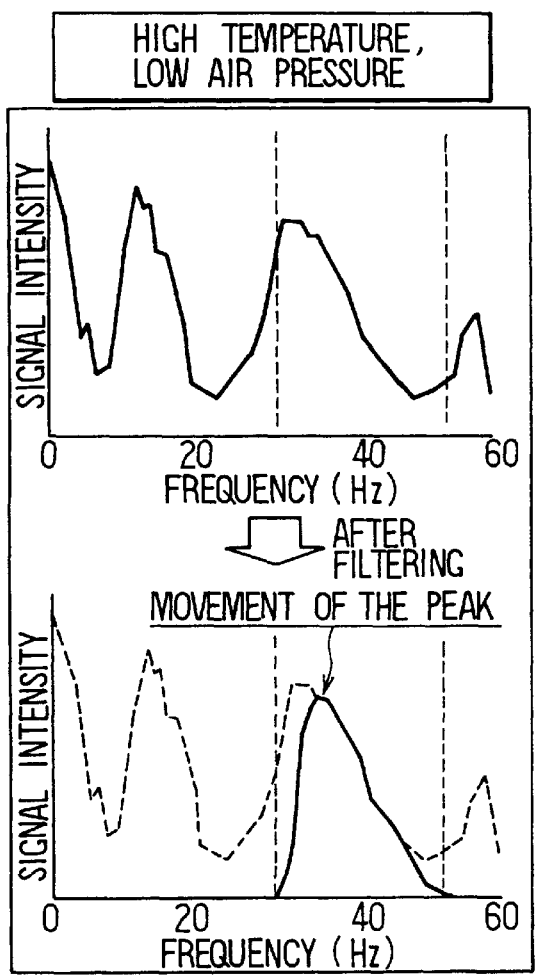
Figure 17:
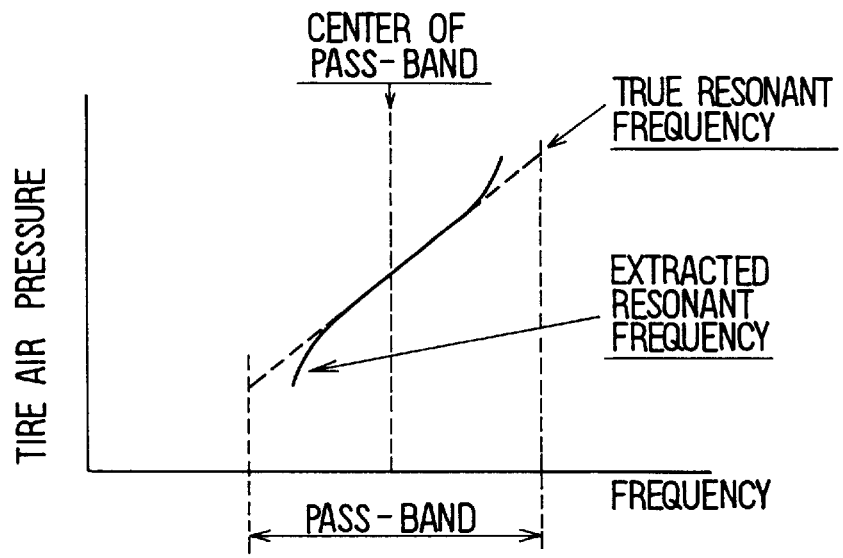
FIG. 17 is a characteristic diagram showing one example of resonant frequency extracted with a fixed narrow band filter.

A correcting map shown in FIG. 15 is used for this correction.

In the next step 250, the previously calculated resonant frequency ω1 is compared in magnitude with the corrected decision value ωk' used for determining a tire air pressure decrease. If the resonant frequency ω1 is less than the corrected decision value ωk', the result of the decision is that an abnormal tire air pressure has taken place. In this case, at step 160, the display unit 7 shown in FIG. 1 is operated to inform the driver of the air pressure drop.

As described thus far, the tire air pressure-estimating apparatus in accordance with the embodiments estimates the tire air pressure with improved accuracy from the resonant frequency, because the temperature-sensing device is mounted in the signal processor, and because the resonant frequency or the decision value is corrected based on a tire temperature-associated value that is information about the outside air temperature.

In the above-described embodiments, the tire/suspension system of this vehicle is approximated by a linear forecasting model as given by Eq. (2). The parameters of the model are identified by the least squares method to estimate the resonant frequency of the wheel speed signal y(k) dependent on the tire air pressure. Therefore, the amount of calculation and the capacity of memory required can be reduced greatly compared with the case where fast Fourier transform (FFT), for example, is used.

In the above-described embodiments, the batch-type least squares method is adopted to identify the parameters c1 and c2 of the introduced linear forecasting model. Obviously, the sequential-type least squares method may be similarly used.

Models approximated to the third or more orders can be introduced as the above-described linear forecasting model, including the case where the sequential-type least squares model is adopted. Note, however, that the required amount of calculation and capacity of memory increase with increasing of the order. Since each tire has one resonant point dependent on the air pressure, it is only required that this linear forecasting model be approximated up to the second order.

Although the amount of calculation and capacity of memory required are increased compared with these cases in which a linear forecasting model is introduced, the above-described resonant frequency-extracting portion 213 may perform fast Fourier transform (FFT) calculations on signals containing vibrational components of the tire produced from the wheel speed sensor 10 and the wheel speed-calculating portion 100 that are vibrational component output means. The resonant frequency is calculated from the frequency spectrum obtained by the FFT calculations. This configuration is effective in suppressing deterioration of the accuracy with which the tire air pressure is estimated by the prior art apparatus.

The apparatus according to the first embodiment corrects the extracted resonant frequency based on the aforementioned tire temperature-associated values. FFT calculations can be used to extract the resonant frequency. The tire air pressure is estimated according to the corrected resonant frequency. However, alternatively, the tire air pressure may be estimated, using the extracted resonant frequency value as it is. The estimated tire air pressure may be corrected based on the amount of influence of the tire air-pressure-associated value.

Apparatus according to any one of the embodiments described above estimates the tire air pressure and gives a warning when the air pressure has decreased. Taking the above-described electronic control unit 6 shown in FIG. 4 as an example, the estimated air pressure may be sent as a tire air pressure signal from the control unit 6 to a brake control computer or traction control computer, for example. That is, the apparatus can be used as a correcting unit in these controls.

Tire temperature-associated values can be estimated considering the following conditions, in addition to the outside air temperature. For example, if the vehicle body speed is kept at a relatively high value (e.g., more than 60 km/s), and if the vehicle runs continuously for more than a given time (e.g., 90 minutes) or over a predetermined distance, it is expected that the tires generate heat due to the running. Therefore, it can be considered that the temperature goes higher further above the outside air temperature. Accordingly, if the vehicle speed is in excess of a given value, and if the continuous running time is in excess of a given time, the tire temperature may be estimated with a positive amendment to the outside air temperature detected by the temperature-detecting device 6i. This amendment may be carried out only when the outside air temperature is higher than a given temperature (e.g., 25° C.), for the following reason. It can be considered that when the outside air temperature is low, the amount of heat generated by the tire is not so much in spite of continuous running at a very high speed.

In brake control or traction control, the maximum value of the wheel speeds of the wheels may be taken as the vehicle speed. However, if the tire air pressure in any one of these wheel drops, the radius of the wheel decreases. This increases the apparent speed of the wheel. Accordingly, if the apparently increased wheel speed can be corrected according to the tire air pressure signal, brake control or traction control will not be provided in accordance with the incorrect wheel speed.

The tire air pressure is deeply concerned with the frictional coefficient of the road surface. Therefore, the above-described tire air pressure signal can be used as a signal for correcting the frictional coefficient.

As mentioned previously, the temperature-sensing device 6i is incorporated in the ECU 6. This ECU 6 can be designed to perform anti-skid control or traction control in addition to estimation of the tire air pressure. If the sensing device 6i is located within a metallic or resinous ECU housing, the device 6i can be easily protected from dust or the like. A microcomputer used to estimate the tire air pressures may be mounted within the ECU for providing anti-skid control. Also, the temperature-sensing device 6i may be mounted within the housing of the ECU for providing anti-skid control.

In the embodiment illustrated in FIG. 9, the resonant frequency is corrected in step 140 according to the estimated air temperature Temp, which is updated if the value of the temperature Ti detected when the ignition switch is turned on second time or later is lower than the estimated outside air temperature Temp. In the above embodiment, a decision is made as to the number of times the ignition switch is turned on in step 10. This decision may also be made in the manner described below. A time counter is provided, that is kept in operation even when the ignition switch is turned off. An elapsed time between a time when the ignition switch is turned off and a next time when the ignition switch is turned on is measured. A decision is made as to whether this elapsed time has reached a reference time. For example, this reference time is 24 hours. When the driver is using the vehicle, the ignition switch is turned on and off repeatedly. The reference time may be determined, taking account of the maximum duration of driving and the maximum duration of stop. The number of times i the ignition switch is turned on may be cleared when the elapsed time exceeds the reference time.

In spite of the estimation of the outside air temperature described thus far, the following method may also be adopted.

For example, in FIG. 9, a decision is made as to whether the total count of a time counter kept in operation even when the ignition switch is turned off reaches the reference time (step 10). For instance, this reference time is 5 hours. That is, an elapsed time during which the ignition switch is kept off is detected, with which the temperature of the device 6i converges to the outside air temperature indicated by point a in FIG. 6. only when the result of the decision is YES, the detected temperature is set as the estimated outside air temperature Temp. Control processing then goes to step 100 and the following steps.

(Third Embodiment)

A tire air pressure-estimating apparatus according to a third embodiment of the present invention is described by referring to FIGS. 16A–19.

The structure of the apparatus in accordance with the third embodiment is substantially the same as that of the first embodiment. Therefore, the description of the structure is omitted. It is to be noted that, in the first embodiment, the temperature-sensing device 6i is installed in the housing of the ECU 6. However, the temperature-sensing device 6i does not need to be installed in the housing of the ECU 6, but can be disposed outside the housing. Further, when the vehicle is provided with an air conditioning system or an engine control system, a temperature sensor of the system can be used as the temperature-sensing device 6i.

Figure 18:
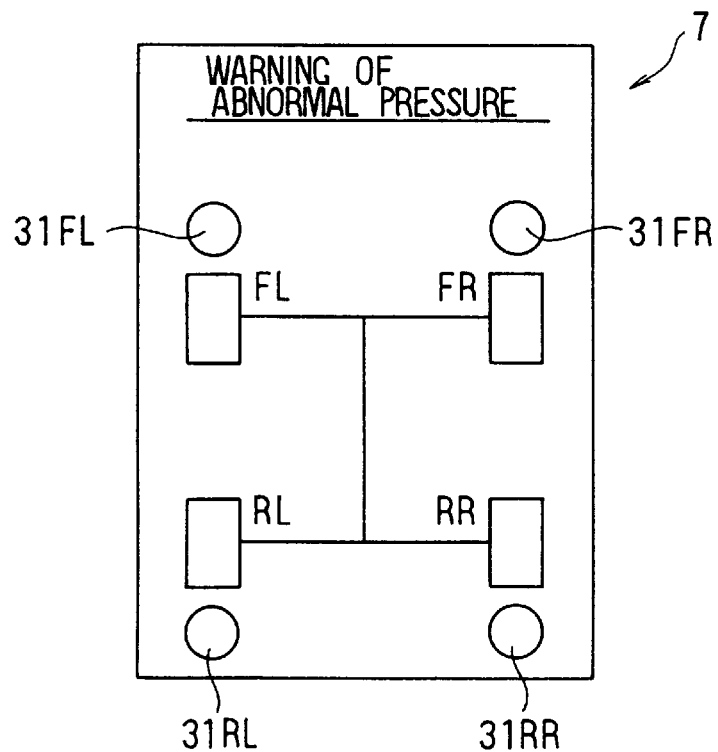
FIG. 18 is a schematic diagram showing one example of the display unit.

In the apparatus of the third embodiment, the display unit 7 displays the results of decisions made by the signal processor 20 regarding the tire air pressures. An example of the display unit 7 is shown in FIG. 18. As shown in FIG. 18, the display unit 7 is provided with warning lamps 31FL–31RR for each tire. Specifically, the ECU 6 lights a warning lamp 31FR when the tire air pressure inside the right-front wheel FR is determined to be abnormal. In the similar manner, a warning lamp 31FL indicates abnormality of the left-front wheel FL. A warning lamp 31RR indicates abnormality of the right-rear wheel RR. A warning lamp 31RL indicates abnormality of the left-rear wheel RL. That is, the operation of the warning lamps 31 (FR–RL) is controlled by the ECU 6.

Therefore, if any tire is determined to have abnormal air pressure, the warning light quickly informs the driver of which of the tires is abnormal with good visibility. Only one warning lamp may be provided and inform the driver that at least one of the tires has a lowered air pressure.

The signal processor 6 makes a decision based on the outputs from the wheel speed sensors 2–5 (wheel speed signals) and on the output (outside air temperature signal) from the temperature-sensing device 6i as to whether the air pressure in each tire is abnormal or not. The signal processor 6 produces driving signals to the display unit 7 to control the displayed information.

Figure 19:
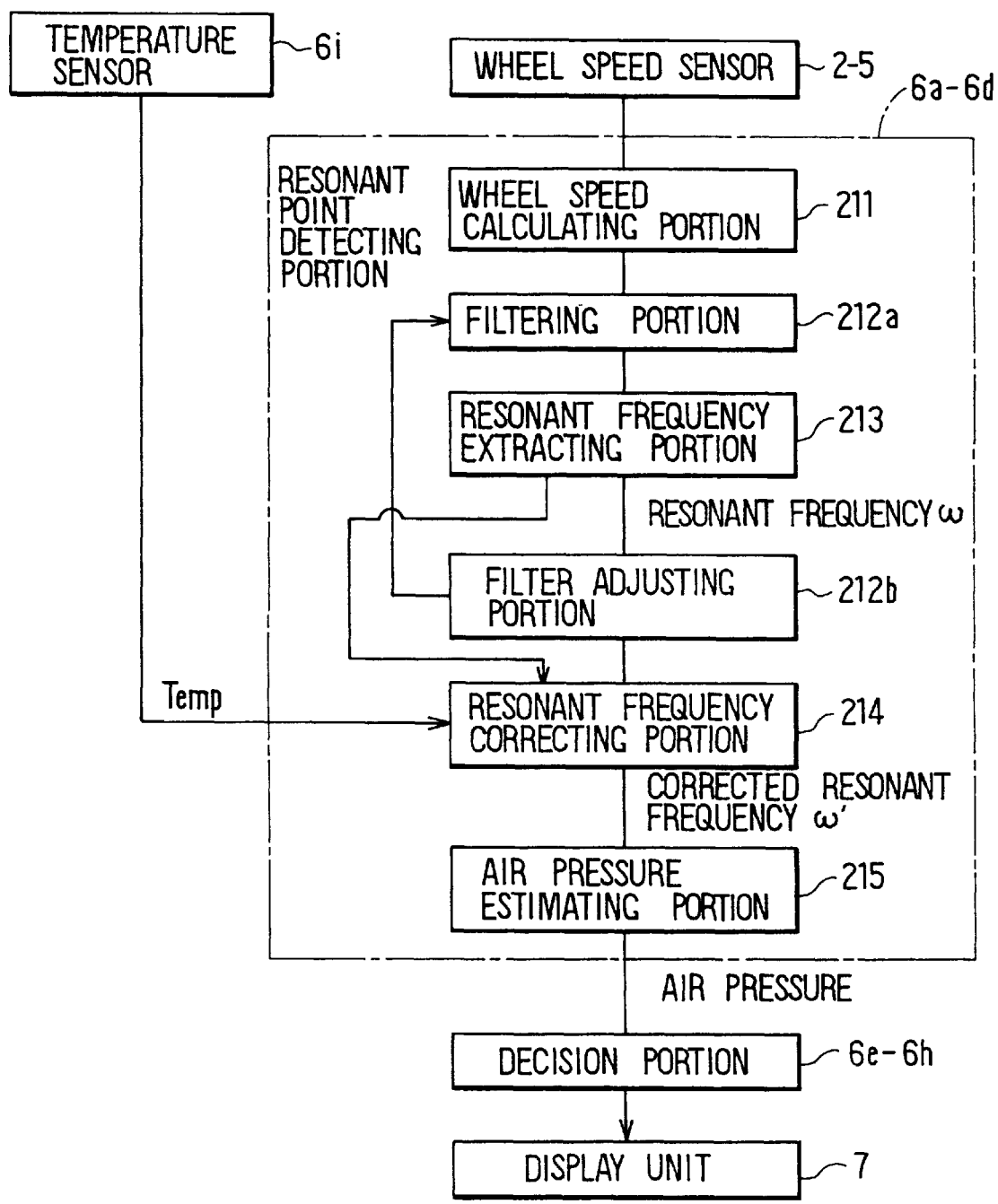
FIG. 19 is a block diagram illustrating control flow according to the third embodiment.

FIG. 19 shows a detailed structure of the resonant point-detecting portion 6a–6d of the third embodiment. In FIG. 19, for sake of convenience, only arbitrary one of the systems corresponding to the wheels shown in FIG. 1 is shown.

In FIG. 19, a wheel speed-calculating portion 211 wave-shapes an AC signal produced from the wheel speed sensor 2–5 to convert it into a binary pulsed signal, calculates the average value of the pulse intervals at every reference sampling interval (e.g., 5.0 ms), and calculates the wheel speed from the inverse of the calculated average value. Thus, the wheel speed-calculating portion 211 produces a signal indicative of the calculated wheel speed at every sampling interval.

A filtering portion 212a extracts only signal components that are close to the resonant frequency dependent on the tire air pressure from the produced signal indicative of the wheel speed.

A filter-adjusting portion 212b finds the optimum filtering range based on the resonant frequency found by processing (described later), and adjusts the filtering range (pass-band) of the filtering portion 212a for the next calculation. First, the pass-band of the filtering portion 212a is set wide enough to cover a frequency range of the vibrational components amply embracing an air pressure range to be detected, taking account of the possibility that the resonant frequency has changed due to tire replacement or the like. In this way, the resonant frequency $\omega$ is found roughly. For example, it is assumed that the pass-band of the filtering portion 212a is set to 30 to 50 Hz when the wheel speed signal passes through the filtering portion 212a in a first estimation of the tire air pressure after the ignition switch is turned on. A resonant frequency-extracting portion 213 temporarily extracts the resonant frequency from the wheel speed signal having passed through the filtering portion 212a. Subsequently, the filter-adjusting portion 212b modifies the width of the pass-band of the filtering portion 212a. At this time, the pass-band is changed from the previous range of 30 to 50 Hz to a range of 32 to 48 Hz. This modification of the pass-band is repeated a given number of times determined by the vehicle speed and other factors. It is assumed that the final pass-band of the filtering portion 212a is 38 to 42 Hz. When the signal is fed from the filtering portion 212a to the resonant frequency-extracting portion 213 and then to the filter-adjusting portion 212b, the pass-band of the filtering portion 212a is shifted. This shift is made, based on the resonant frequency that is the result of the previous extraction made by the resonant frequency-extracting portion 213. For example, when it is assumed that the resonant frequency $\omega$ extracted the last time is 40.5 Hz, based on this resonant frequency $\omega$, the pass-band of the filtering portion 212a is shifted from the range of 38 to 42 Hz to a range of 38.5 to 42.5 Hz so that the center frequency of the pass-band becomes 40.5 Hz. Then, when it is assumed that, based on the output signal from the filtering portion 212a having the pass-band of 38.5 to 42.5 Hz, the resonant frequency-extracting portion 213 extracts a resonant frequency of 40.2 Hz, the pass-band of the filtering portion 212a is shifted to a range of 38.2 to 42.2 Hz so that the center frequency of the pass-band becomes 40.2 Hz.

It is to be noted, the modification of the width of the pass-band is made a given number of times determined by the conditions, and the shift of the pass-band may be continued while estimation of the tire air pressure is being made after the modification of the width. As mentioned previously, the pass-band is shifted based on the resonant frequency $\omega$ extracted the last time by the resonant frequency-extracting portion 213, and the shift is made based on this resonant frequency $\omega$. In spite of this method, the following method may also be adopted. It is assumed that the present pass-band of the filtering portion 212a is 38 to 42 Hz and that the resonant frequency $\omega$ extracted this time is 41 Hz. The present center position of the pass-band is 40 Hz. A permitted reference range used for estimation of tire air pressures is established about this 40 Hz. For instance, this reference range is established as a range of plus minus 0.1 Hz of 40 Hz. This reference range is constant during the estimation of tire air pressures or varied according to the vehicle speed or other factors. The resonant frequency 41 Hz extracted this time does not fall within the reference range obtained by adding the margin of plus minus 1 Hz to the center position (40 Hz) of the pass-band, i.e., 39.9 to 40.1 Hz. Accordingly, such control may be provided that shift of the pass-band based on the resonant frequency $\omega$ extracted this time is permitted. If the resonant frequency $\omega$ lies within the reference range, i.e., 39.9 to 40.1 Hz, shift of the pass-band is not made.

Two reference ranges can be established (e.g., plus minus 0.1 Hz and plus minus 0.5 Hz of the center position). If a resonant frequency exceeding the greater reference range is extracted, an air pressure-estimating portion 215 (described later) may prohibit estimation of the air pressure or the decision portion 6e–6h may prohibit the decision. When the resonant frequency falls within the greater reference range but is out of the smaller reference range, the shift of the reference range may be permitted.

In this way, the filter-adjusting portion 212b modifies the width of the pass-band of the filtering portion 212a. That is, the pass-band is narrowed to enhance the accuracy of the extracted resonant frequency. Similar processing is repeated, based on the obtained resonant frequency $\omega$. After the width of the pass-band of the filtering portion 212a has been set so that the detection accuracy is made optimal, only shift of the pass-band is made. As a result, the resonant frequency can be extracted without being affected by noises.

The signal component having passed through this filtering portion 212a becomes the wheel speed signal y(k) defined in the description of the principle.

The resonant frequency-extracting portion 213 identifies the parameters c1 and c2 of the above-described discrete time model from the wheel speed signal y(k) extracted by the filtering portion 212a, using Eq. (7). The extracting portion 213 computes the resonant frequency $\omega$ from the identified parameters c1 and c2, using Eq. (10).

The resonant frequency $\omega$ is fed from the resonant frequency-extracting portion 213 to the filter-adjusting portion 212b. This filter-adjusting portion 212b shifts the pass-band of the filtering portion 212a and modifies the width a given number of times determined according to the conditions such as the wheel speed. For example, when the wheel speed is low, the response time of calculation-processing for estimation of the tire air pressure is not required to be very short. Further, at that time, the number of pulses obtained by wave-shaping the wheel speed signal input per unit time is few. Therefore, the filter adjustment, that is, modification of the width of the pass-band and the shift thereof are repeated increased number of times. During high-speed running, the number of pulses of the wheel speed signal per unit time is great. If the passenger is not quickly informed of an air pressure drop, possibility of danger increases. Therefore, the modification of the width of the pass-band and the shift thereof are repeated a reduced number of times. The width modification and the shift may be changed to the same repetition rate. The repetition rate of the shift may be changed while the repetition rate of the width modification is maintained constant. Alternatively, the repetition rate of the width modification may be changed while the repetition rate of the shift is maintained constant. The repetition rates of the shift of the pass-band and the width modification thereof may be varied under the following conditions. During estimation of air pressure within a reference time period subsequent to turning on the ignition switch or within a reference number of times immediately after turning on the ignition switch, the pass-band is shifted and/or the width thereof is modified at high repetition rates to give priority to the accuracy. After that, priority is given to the responsiveness of the calculation processing of the tire air pressure. The pass-band is shifted and/or the width thereof is modified at lower repetition rates.

A resonant frequency-correcting portion 214 is a portion for correcting the calculated (extracted) resonant frequency ω based on the outside air temperature Temp detected by the outside air temperature sensor 6i.

As mentioned previously, the extracted resonant frequency ω is affected by the outside air temperature Temp, and varies with the outside air temperature Temp even if the tire air pressure is constant, as shown in FIG. 10.

In particular, as shown in FIG. 10, at the same tire air pressure, the resonant frequency ω increases as the outside air temperature Temp gets lower. This is because, as the outside air temperature Temp drops, the rubber portion of the tire hardens, thereby increasing the tire spring constant.

To prevent the accuracy with which the resonant frequency ω is extracted from being deteriorated due to the outside air temperature Temp, it is necessary to correct the fresonant frequency ω according to the outside air temperature Temp in the manner shown in FIG. 11.

For this purpose, a correcting map as shown in FIG. 12 is stored in the resonant frequency-correcting portion 214. The resonant frequency ω extracted (calculated) as described above is corrected using this correcting map in the same manner as the first embodiment.

In the resonant point-detecting portion 6a–6d shown in FIG. 19, the air pressure-estimating portion 215 is a portion for estimating the air pressure p based on this corrected resonant frequency ω'.

As mentioned previously, if the tire air pressure is high, its resonant frequency is also high. Conversely, if the tire air pressure is low, its resonant frequency is also low. Accordingly, this air pressure-estimating portion 215 has a map describing the relation between these tire air pressure p and corrected resonant frequency ω' as shown in FIG. 3. The corresponding value of the air pressure p is estimated directly from the corrected resonant frequency ω'.

The resonant point-detecting portion 6a–6d produces estimated values of the tire air pressure p to their respective decision portions 6e–6h according to the resonant frequency ω' extracted as described above and corrected according to the outside air temperature Temp.

The decision portions 6e–6h make decisions based on comparisons of a decision value with the values of the tire air pressures p produced from the resonant point-detecting portion 6a–6d as to whether their respective tire air pressures are abnormal or not, the decision value being previously set as a threshold value for determining whether the air pressures are abnormal. If the value of any one tire air pressure p produced from the resonant point-detecting portion 6a–6d is lower than the above-described decision value, then the air pressure is regarded as abnormal. The corresponding display portion 31FL–31RR is driven.

In the display portion 7, a driving signal is supplied from the decision portion 6e–6h in this way. This lights the corresponding warning lamp 31 (FIG. 18), thus informing the driver of existence of any one tire determined to have an abnormal air pressure.

Specifically, if any tire air pressure drops excessively during vehicle traveling because natural leakage occurs or the vehicle treads a nail, the driver is immediately informed of this fact.

If the corresponding tire is replenished with air in response to this information, and if the air pressure is restored to its normal level, the above-described decision portion 6e–6h stops supplying the driving signal to the display unit 7. The lit warming lamp 31 is made to go off.

Although the amount of calculation and capacity of memory required are increased compared with a case in which a linear forecasting model is introduced, the above-described resonant frequency-extracting portion 213 may be operated to perform fast Fourier transform (FFT) calculations on signals containing vibrational components of the tire produced from the wheel speed sensor 2–5 and the wheel speed-calculating portion 211. The resonant frequency is calculated from the frequency spectrum obtained by the FFT calculations. Obviously, methods utilizing well-known procedures for calculations of frequency spectra such as Fourier transform, discrete Fourier transform (DFT), Walsh transform, fast Walsh transform, or an autocorrelation function, Kepstrum analysis, bispectrum analysis, Wablet transform, and so on can be exploited.

Obviously, system identification procedures that are well-known techniques can be used to indirectly estimate the above-described resonant frequency. These system identification procedures represent the present system as a model and indirectly estimate the resonant frequency by identifying parameters of the model. A method to identify the parameters includes batch-type least squares method, sequential-type least squares method, correlation method, forecasting error method, canonical variable analysis method, singular value-resolving method, adaptive identification method.

In the above embodiment, both width modification and shift of the pass-band of the filtering portion 212a are carried out. At least one kind of processing may be performed. That is, either the width modification or the shift of the pass-band may be carried out. The number of repetitions the width modification or shift is carried out may be made variable.

A portion for permitting or inhibiting the execution of the width modification or shift of the pass-band depending on the intensity of the signal provided from the wheel speed sensor, i.e., the magnitude of the power spectrum, may be provided between the resonant frequency-extracting portion 213 and the filter-adjusting portion 212b shown in FIG. 19. Specifically, when the intensity of the wave-shaped wheel speed signal is large, even if noise is somewhat large, signals associated with the true resonant frequency can be sufficiently precisely extracted. Further, if the width modification or shift of the pass-band of the filtering portion is carried out, there is a possibility of erasure of signals associated with the true resonant frequency. This in turn may adversely affect the accuracy with which the tire air pressure is estimated. Therefore, the width modification or shift of the pass-band may be permitted or inhibited, depending on the signal intensity. At this time, the intensity of vibration may be compared with a certain reference value. The width modification or shift of the pass-band may be permitted or inhibited according to the result of the comparison.

(Fourth Embodiment)

Figure 20:
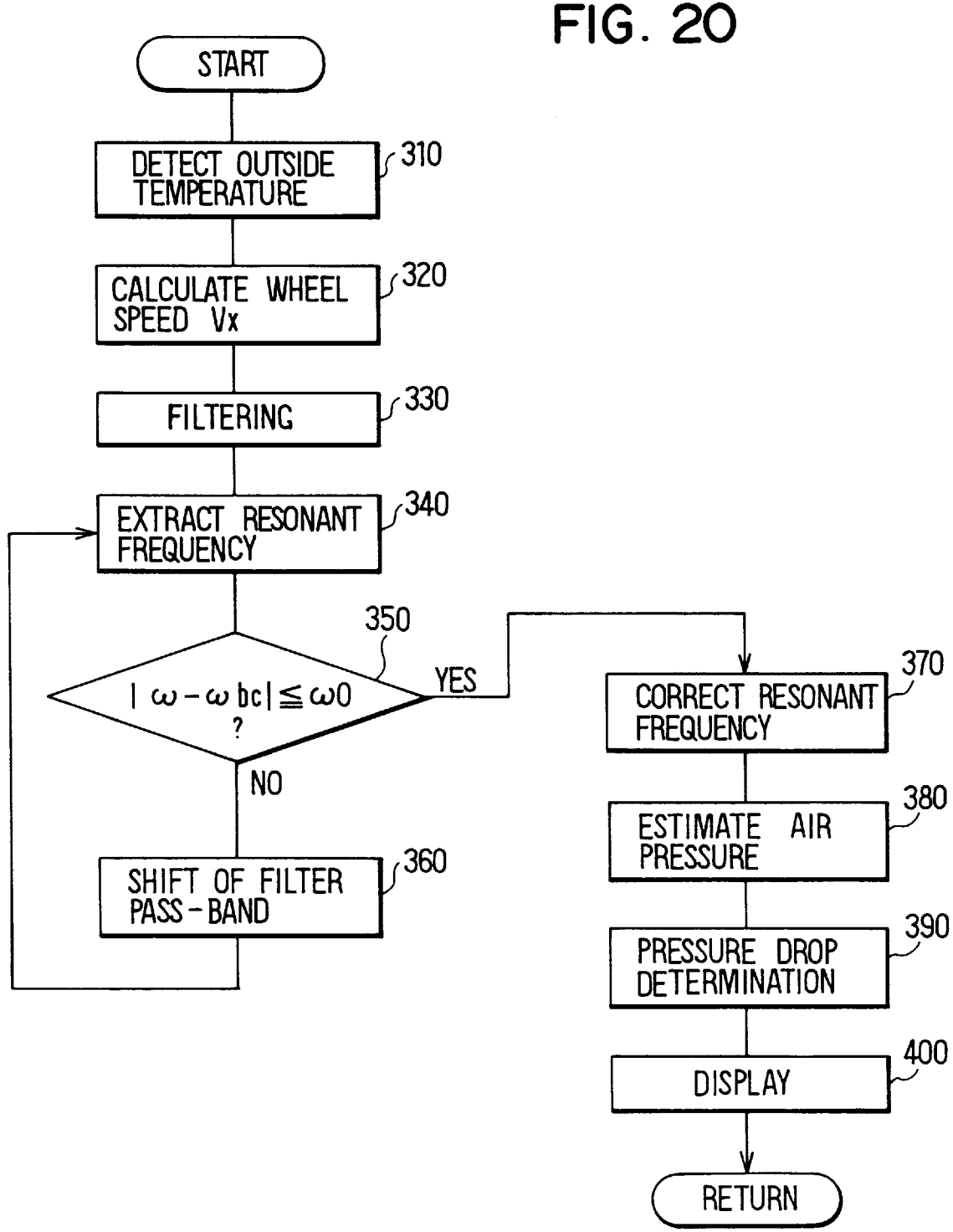
FIG. 20 is a flowchart illustrating control processing of a fourth embodiment.

A fourth embodiment of the present invention is next described by referring to FIG. 20, which is a flowchart illustrating the flow of control executed within a signal processor 6 in accordance with the fourth embodiment. This flow of control is performed similarly for each tire sequentially. The flowchart given below illustrates the processing for only one tire.

When the ignition switch of the vehicle is turned on to start the vehicle, the flow of control is started. In step 310, an outside air temperature is detected based upon a detection signal of an outside air temperature sensor (temperature sensing device) 6i. In step 320, the signal from the wheel speed sensor 2–5 is read in, and a wheel speed Vx is calculated.

In step 330, the relative intensity of the vibrational components of the tire contained in the wheel speed signal is increased, using a narrow band filter (hereinafter referred to as a bandpass filter (BPF)) having a pass-band of a preset frequency range, whereby the vibrational components of the tire is extracted. The filter has been previously stored in the ROM 202 incorporated in the ECU 20. Hence, the number of filters prepared for incorporation is limited.

Shift of the pass-band of the filter described below starts from the bandpass filter illustrated in step 330.

In step 340, the resonant frequency ω is calculated from the vibrational components of the tire extracted in step 330 by the aforementioned linear forecasting method.

In step 350, the difference between the resonant frequency ω extracted in step 340 and the center frequency ωbc of the bandpass filter used for the calculation is found. A decision is made as to whether this error has reached ω0. If the result of the decision is NO, control processing goes to step 360, where the pass-band of the filter is shifted. This shift may consist of shifting the pass-band by a preset value of 0.5 HZ in one operation. Steps 340–360 are repeated. That is, the filter shift is repeated until the absolute value of the difference between the found resonant frequency ω and the center frequency ωbc of the bandpass filter enters a given range ω0, i.e., until the result of the decision made in step 350 becomes YES.

If the result of the decision made in step 350 is that the frequency difference enters the given range, i.e., the result of the decision is YES, control processing proceeds to step 370, where the resonant frequency is corrected to eliminate the effects of the outside air temperature on the resonant frequency of the tire.

In the next step 380, the tire air pressure is estimated from the resonant frequency corrected in step 370.

In the next step 390, a decision is made as to whether the tire air pressure is lower than a preset threshold value used for decision of air pressure drop. A decision is made based on this result as to whether the display unit 7 lights a warning lamp (step 400).

(Fifth Embodiment)

Figure 21:
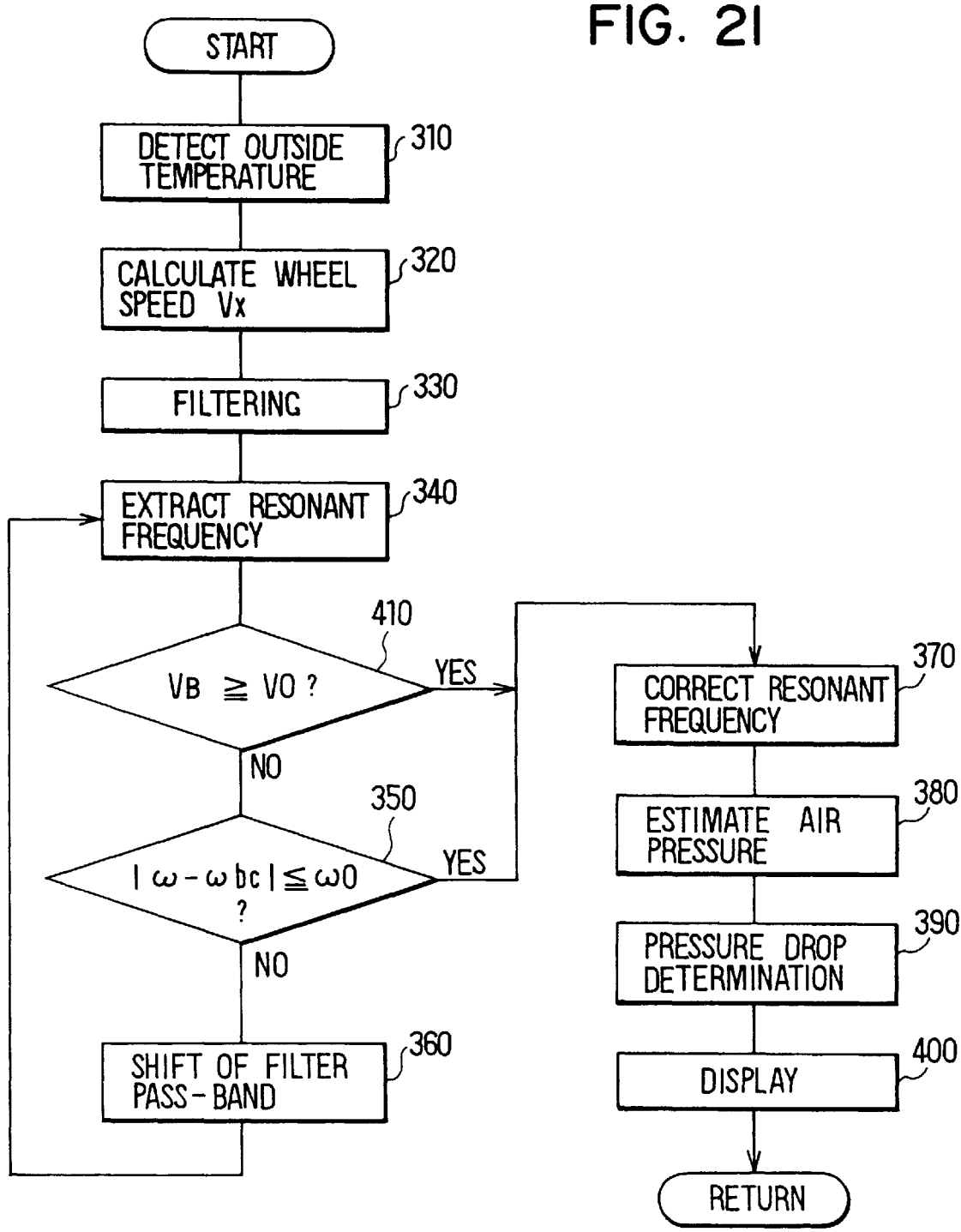
FIG. 21 is a flowchart illustrating control processing of a fifth embodiment.

A fifth embodiment is described by referring to FIG. 21. Those steps of the following embodiments which are the same as those of the fourth embodiment described in connection with FIG. 20 are denoted by the same step numbers and will not be described below.

In this fifth embodiment, another condition (vehicle speed) for permitting shift of the filter is added.

The pass-band of the filter is shifted only when the vehicle speed VB is lower than a preset value V0. If the vehicle speed VB is equal to or larger than the preset value, the pass-band of the filter is not shifted.

In step 410, the vehicle speed VB is calculated from the result of the calculation of the wheel speed Vx executed in step 320. This is compared with a preset vehicle speed V0. If the result of the decision made in step 410 is that the wheel speed VB is less than V0, control processing goes to step 350, where the absolute value of the difference between the resonant frequency ω extracted in step 340 and the center frequency ωbc is compared with the preset difference value ω0. When the difference is in excess of the preset difference value f0, the result of the decision shows that it is necessary to shift the filter. Control processing goes to step 360, and the pass-band of the filter is shifted. The filter shift is continued until the difference between the resonant frequency ω and the center frequency ωbc of the bandpass filter comes within a given range.

If the result of the decision made in step 410 is YES, or if the result of the decision made in step 350 is YES, control processing goes to step 370, where the resonant frequency ω is corrected. In this way, if the vehicle speed VB is in excess of a given speed V0 (step 410), the resonant frequency is corrected based upon the outside air temperature without executing step 350 or 360. This control using the vehicle speed takes the system's response time into consideration. For example, the aforementioned given vehicle speed V0 may be set to 80 Km/h. At vehicle speeds such as highway running speeds, the input signal are supplied at high rates from wheel speed sensors to the ECU 6. At this time, if the filter is shifted, the response time of estimation of the tire air pressure slows down. During vehicle traveling at high speed, the necessity to detect gradual drop of the tire air pressure is not very high. It is high likely that detection of only rapid air variations caused by, for example a burst of a tire is required. Therefore, during the vehicle traveling at high speed, it is more advantageous to shorten the response time in estimating the air pressure so as to carry out decision of the burst rather than making precise estimation of the air pressure by shifting the pass-band of the filter.

As described later, the control provided taking account of the vehicle speed is helpful in realizing estimation of the air tire according to the signal intensity, because the signal intensity varies according to the vehicle speed.

(Sixth Embodiment)

Figure 22:
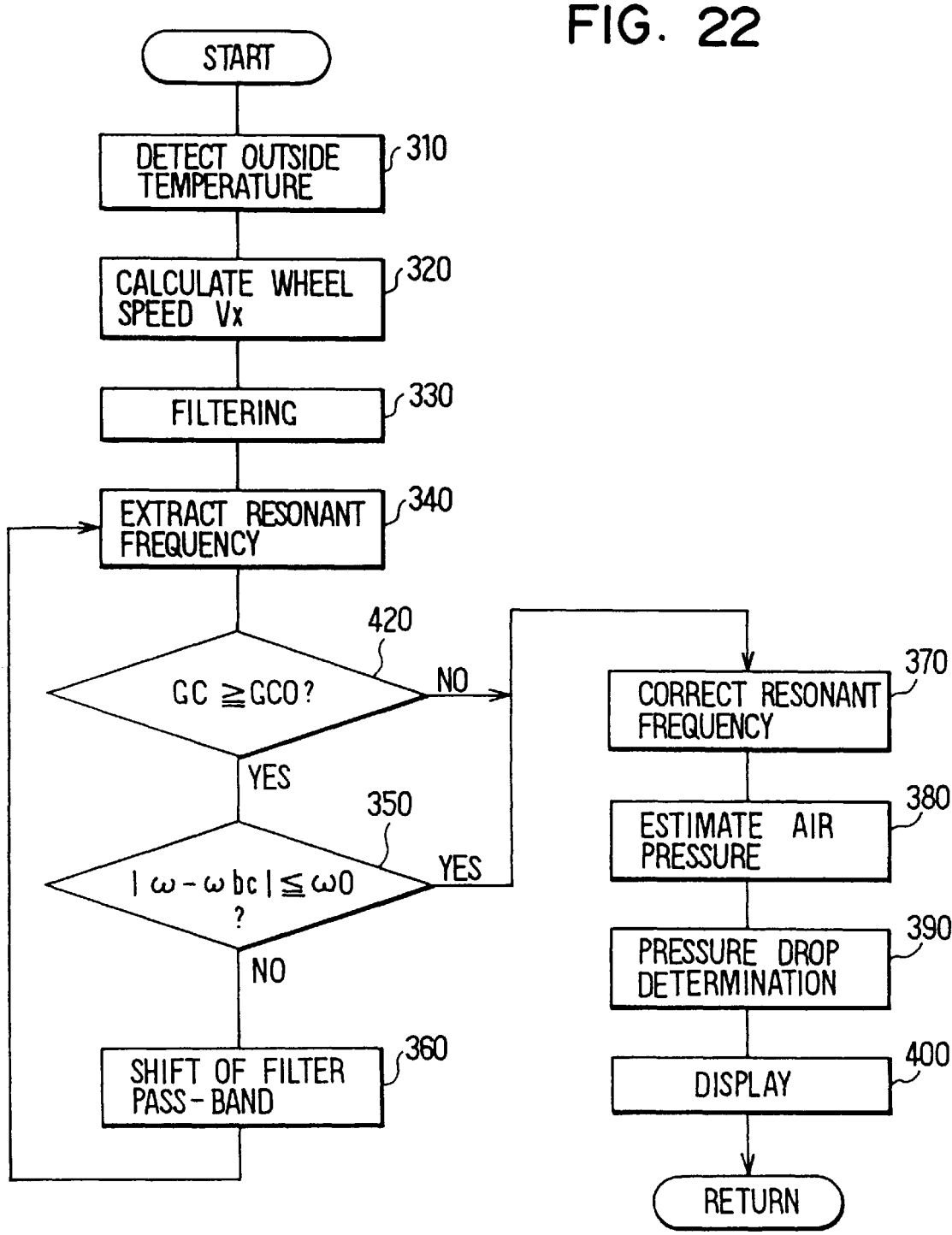
FIG. 22 is a flowchart illustrating control processing of a sixth embodiment.

A sixth embodiment is next described by referring to FIG. 22. In the sixth embodiment, another condition (the signal intensity) for permitting shift of the filter is added to that in the embodiments described thus far. In this example, a signal intensity is used as a condition to permit shift of the filter. The pass-band of the filter is shifted only when the signal intensity of vibrational components is in excess of a preset value. At values less than the present value, the filter is not shifted.

In step 420, the signal intensity GC is found from the wheel speed calculated in step 320 and compared with a preset signal intensity GC0. When the result of the decision is that the signal intensity GC is in excess of GC0, control processing goes to step 350, where the absolute value of the difference between the resonant frequency ω extracted in step 340 and the center frequency ωbc of the bandpass filter used for the calculation is compared with a preset difference value ω0. If the difference is in excess of the preset difference value ω0, the result of the decision shows that it is necessary to shift the filter. Control processing proceeds to step 360, where the pass-band of the filter is shifted. The filter shift is continued until the difference between the resonant frequency ω and the center frequency ωbc of the bandpass filter comes within a given range. when the result of the decision made in step 420 is that the signal intensity GC is less than the preset value GC0, or when the difference between the resonant frequency ω and the center frequency ωbc of the bandpass filter is within a given range, control processing goes to step 370, where the resonant frequency is corrected based upon the outside air temperature.

Figure 23:
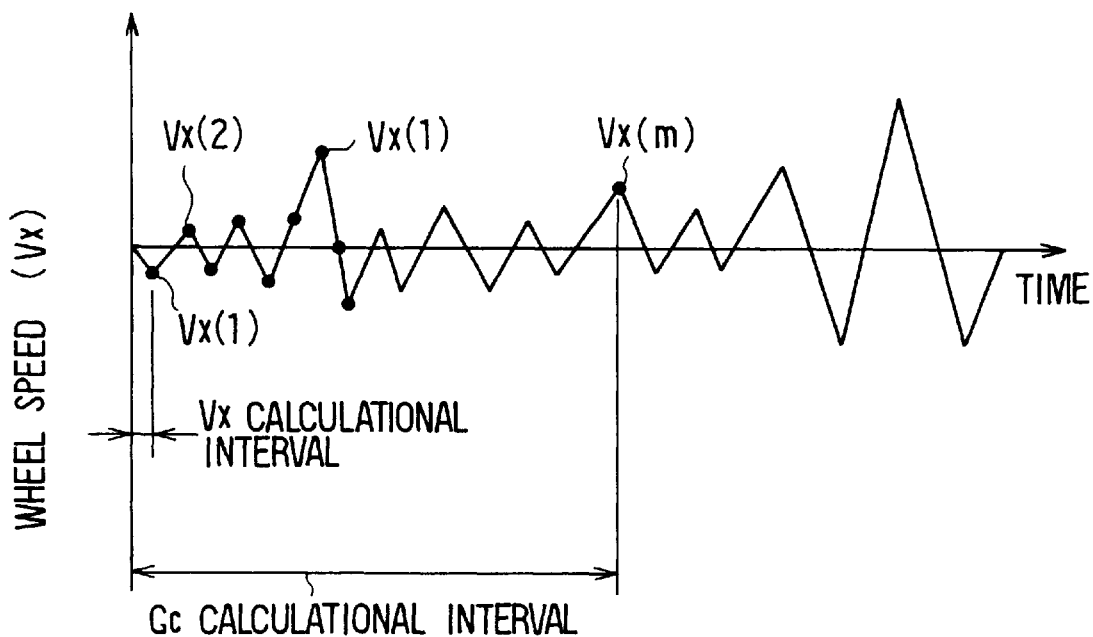
FIG. 23 is a characteristic diagram used as a reference in explaining a specific method of calculating signal intensity.
Figure 24:
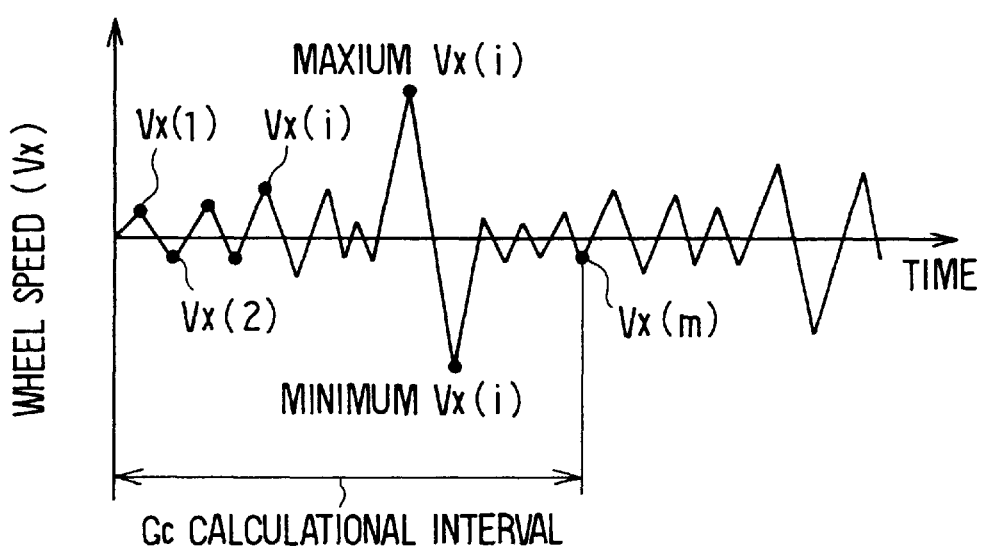
FIG. 24 is a characteristic diagram showing another example of calculating the signal intensity of vibration input from a road surface.

Specific methods of calculating the signal intensity are now described by referring to FIGS. 23 and 24.

Inputs of vibrations from road surfaces can be extracted from variations of the speeds of the wheels (output signals from the wheel speed sensors) by using appropriate bandpass filters, as exemplified by Japanese Patent Application Laid-Open No. 6-270618. FIG. 23 shows a specific example of the method of calculation of the signal intensity (magnitude of the vibrational components).

FIG. 23 is a waveform of the output from the filter (step 330) when wheel speed Vx is filtered. The horizontal axis indicates time. The vertical axis indicates a gain indicating the magnitude of the vibrational components input from the road surface. Let Vx(i) be the value of Vx at every calculational interval of 5 ms, for example. The intensity Gc of the vibration input can be given by $$Gc = \sum_{i=1}^{m} (Vx(i))^2 \tag{14}$$

That is, it can be expressed as the sum of m values of squares of the Vx(i) calculated at every wheel speed calculational interval during the period of the calculation of Gc that is the calculational interval of the signal intensity.

FIG. 24 shows another example of the method of calculating the intensity of vibration input from the road surface. That is, the sum of the maximum gain (maxVx(i)) and the minimum gain (minVx(i)) of the vibrational components of the wheel speed during the calculational interval of the signal intensity is adopted as a signal intensity. It is to be noted that, when the sum of the maximum gain and the minimum gain is calculated, the absolute value of the maximum gain and the absolute value of the minimum gain are added.

(Seventh Embodiment)

A seventh embodiment is described below by referring to FIG. 25. In this Seventh embodiment, the system's operating time is used as a condition for permitting shift of the filter. The number of extractions n of the resonant frequency ω after start of the vehicle by turning on the ignition switch (IG) is used as a value representing the system's operating time. The pass-band of the filter is shifted only when the number of extractions n is more than a preset number n0. At values less than the preset number n0, the filter is not shifted to secure the system's response time. Those steps of the following embodiment which are the same as those of the third embodiment described in connection with FIG. 20 are denoted by the same step numbers and will not be described below.

In step 430, the resonant frequency ω is calculated from the tire vibrational components extracted in step 330 by using the above-described linear forecasting method. At the same time, the number of extractions n is counted.

In step 440, the number of extractions n counted in step 430 is compared with a preset number of extractions n0. When the number of extractions n is equal to or less than the preset number of extractions n0, control processing goes to step 370 without shifting the filter to secure the system's response time. A correction of the resonant frequency is made using the signal from the outside air temperature 40.

When the number of extractions n is greater than the preset number of extractions n0, control processing goes to step 350, where an absolute value of the difference between the calculated resonant frequency ω and the center frequency ωbc of the filter is compared with a preset difference value ω0. If the absolute value is greater than the preset difference value ω0, the result of the decision shows that it is necessary to shift the filter. Control processing goes to step 360, where the pass-band of the filter is shifted. In the same way as in the embodiments described thus far, the shift of the filter is continued until the difference between the calculated resonant frequency ω and the center frequency ωbc of the bandpass filter comes within a given range.

When the number of extractions of the resonant frequency is less than a given number in this way, the tire air pressure can be estimated quickly although not with high accuracy immediately after the ignition switch is turned on. If the vehicle starts from a parking area along a highway, or if the vehicle can go onto a highway quickly from a home parking in a region within a web of highways, rough estimation of the air pressure can be made prior to going onto the highway. After some extractions of the resonant frequencies, or during travel on a highway, the state can be regarded as permitting precise estimation of the air pressure. In this case, control processing is allowed to go to step 350, where a decision is made as to whether shift of the filter should be made. Hence, precise estimation of the air pressure can be made.

In other words, it takes a long time to shift the pass-band of the filter. Therefore, shift of the filter is permitted only when the number of extractions of the resonant frequencies is large as mentioned previously.

(Eighth Embodiment)

Figure 26:
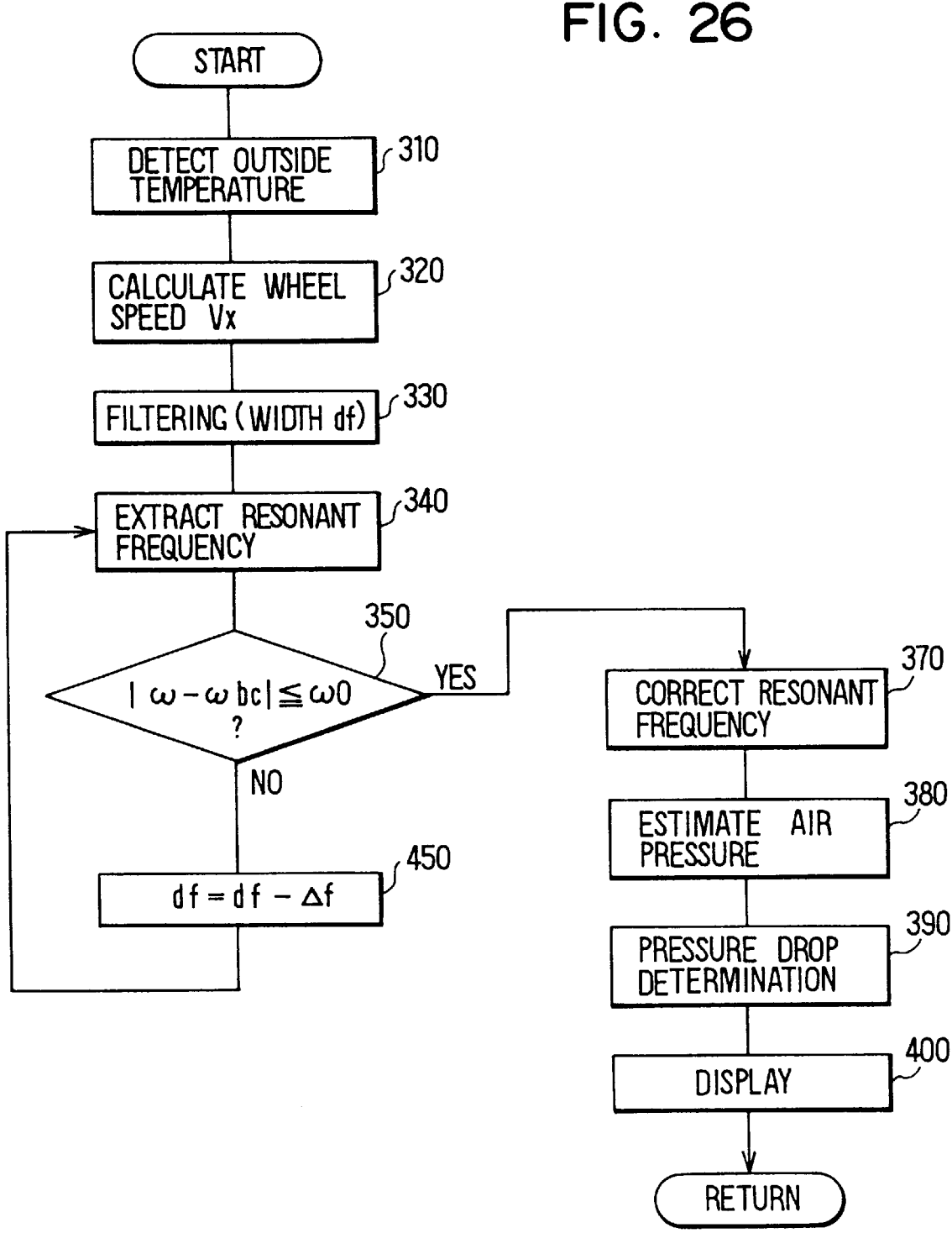
FIG. 26 is a flowchart illustrating control processing of an eighth embodiment.

An eighth embodiment is next described by referring to FIG. 26. In this sixth embodiment, the width of the pass-band of the filter is modified in place of shift of the filter.

The filter through which a wheel speed signal passes in step 330 is a narrow bandpass filter (BPF) having a preset pass-band (width df). This increases the relative intensity of the vibrational components of the tire.

When an absolute value of the difference between the calculated resonant frequency ω and the center frequency ωbc of the filter is larger than a preset difference value ω0, control processing goes from step 350 to step 450. In this step 450, the frequency band df of the filter used for extraction of the resonant frequency ω in step 340 is reduced by a preset frequency band Δf so that the calculated resonant frequency ω approaches to the center frequency ωbc of the filter. That is, when the calculated resonant frequency ω is larger than the center frequency, the lower frequency part of the filter is cut off from the frequency band of the filter, whereby the center frequency ωbc is increased. Conversely, when the calculated resonant frequency ω is lower than the center frequency ωbc, the higher frequency part of the filter is cut off, whereby the center frequency ωbc is decreased.

For example, when step 340 is firstly carried out in calculational processing, the filter performs a filtering action with a pass-band df. If control processing goes back to step 340 from step 450, the filtering action is performed with a pass-band reduced from the filter width df by Δf. If the result of the decision in step 350 is that the difference is still larger than the preset difference value ω0, the pass-band of the filter is further reduced by Δf from the width modified the last time (step 450). With this reduced pass-band, the resonant frequency is extracted in step 340. Such operations are repeated.

(Ninth Embodiment)

Figure 27:
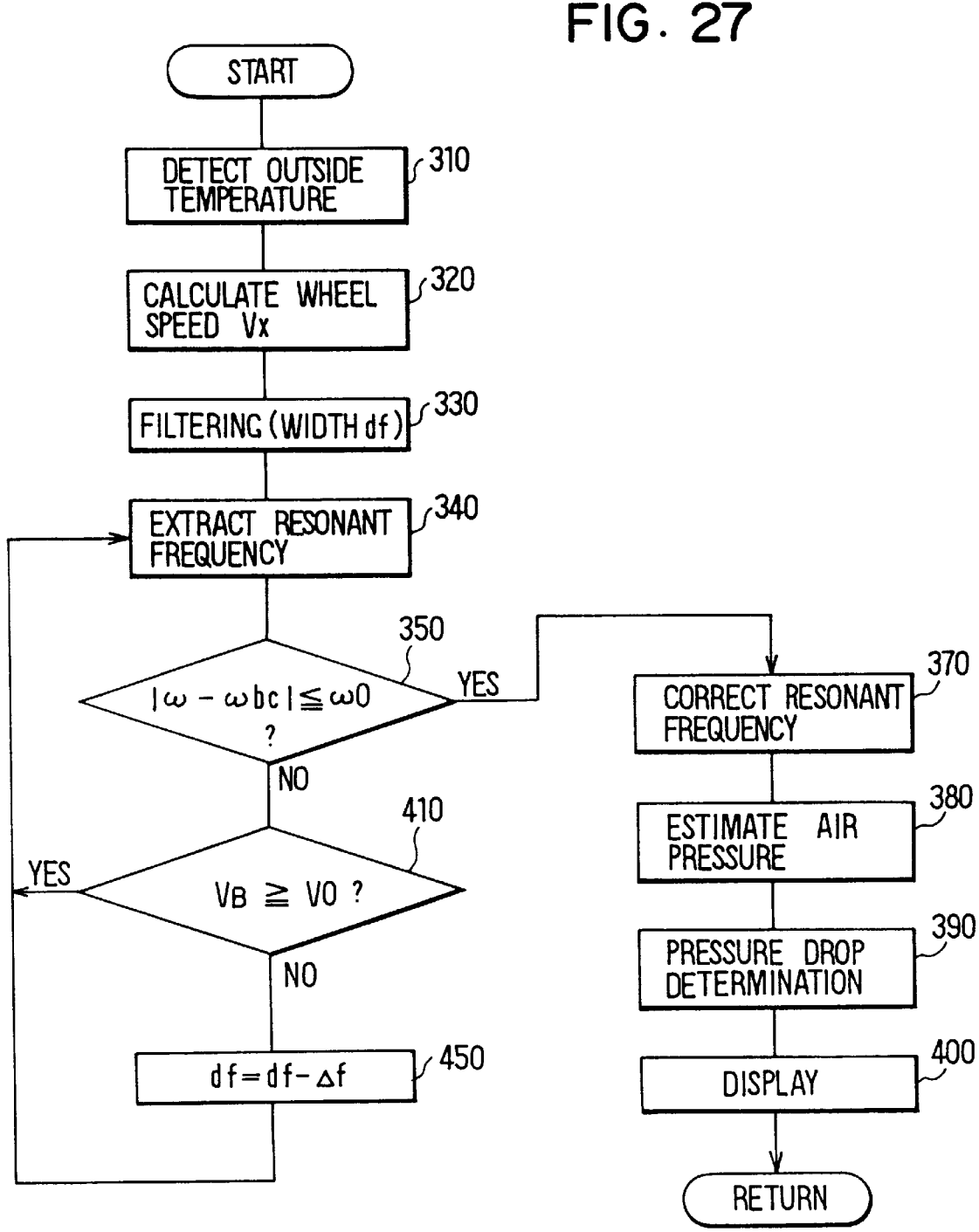
FIG. 27 is a flowchart illustrating control processing of a ninth embodiment.

A ninth embodiment is next described by referring to FIG. 27. In this embodiment, the vehicle speed is used as a condition for permitting modification of the frequency band width of the filter. The width df of the pass-band of the filter is reduced only when the vehicle speed VB is lower than the preset value V0. When the vehicle speed VB is equal to or larger than the preset value V0, the pass-band width of the filter is not reduced. The steps of the ninth embodiment which are the same as those of the third embodiment described in connection with FIG. 20 are denoted by the same step numbers and will not be described below.

If the result of the decision made in step 350 is YES, control processing goes to step 410. The vehicle speed VB is calculated from the wheel speed Vx calculated in step 320, and is compared with a preset vehicle speed V0. When the vehicle speed VB is less than the preset vehicle speed V0, control processing proceeds to step 450. The preset width Δf of the filter is subtracted from the filter width df used to extract the resonant frequency ω in step 340 so that the resonant frequency ω approaches to the center frequency ωbc of the bass-band. Thus, a newω pass-band of the filter is established.

Control processing then goes back to step 340, where the above-described processing is repeated until the difference between the extracted resonant frequency ω and the center frequency ωbc of the pass-band of the filter is equal to or lower than a given value ω0.

If the result of the decision made in step 410 is that the vehicle speed VB is equal to or larger than the preset value V0, modification of the pass-band width is not permitted, and then control processing returns to step 340.

If the frequency difference enters a given range ω0 (step 350), the resonant frequency of the tire are corrected based on the outside air temperature (step 370).

(Tenth Embodiment)

Figure 28:
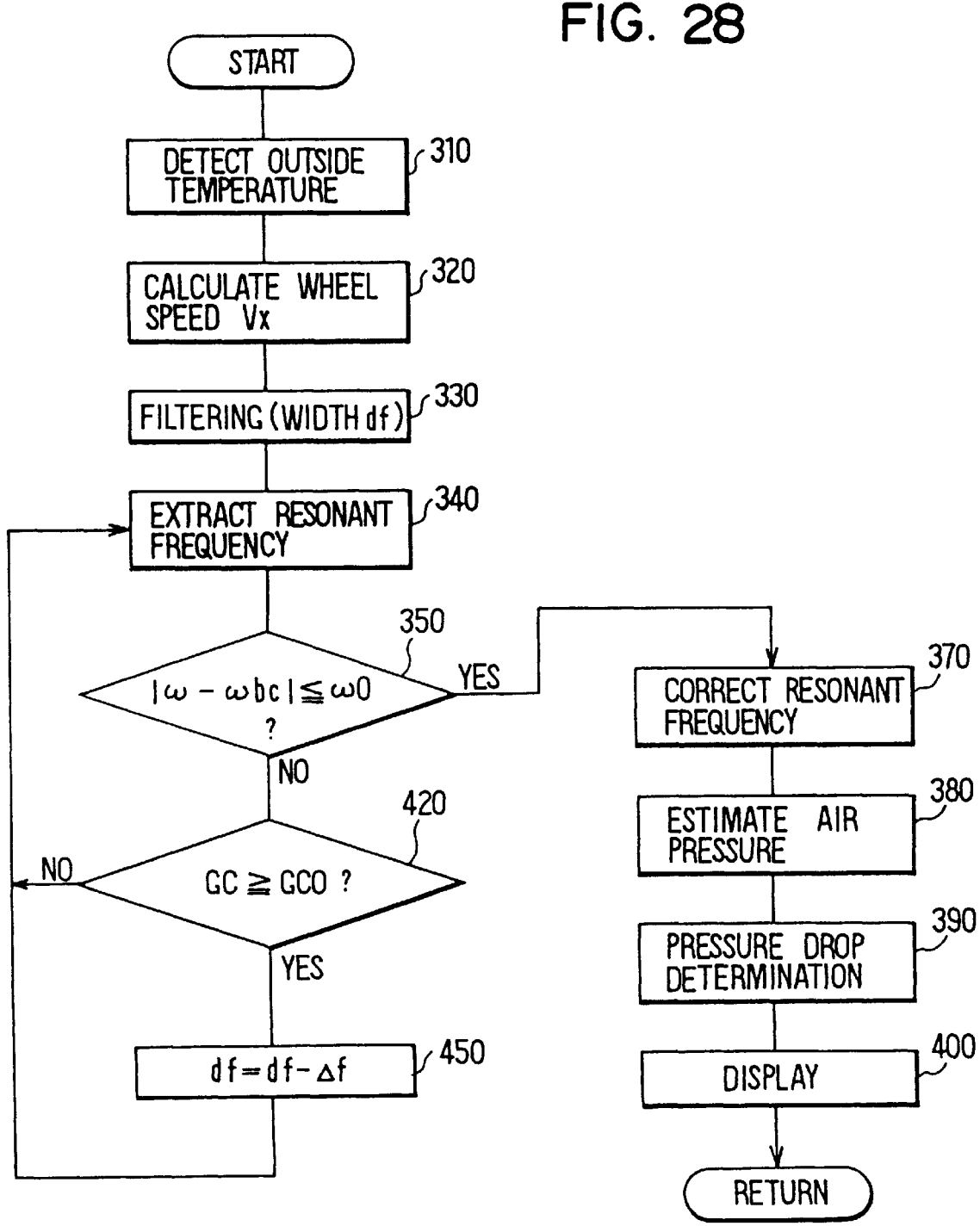
FIG. 28 is a flowchart illustrating control processing of a tenth embodiment.

A tenth embodiment is described by referring to FIG. 28. In this tenth embodiment, a step 420 for judging the signal intensity and a step 450 for subtracting the preset frequency width Δf from the pass-band of the filter used to extract the resonant frequency ω in step 340 are provided. Specifically, only when the signal intensity GC is equal to or greater than a given value GC0, the pass-band width of the filter is modified. When the signal intensity GC is less than the given value GC0, the decision of step 350 is executed but modification of the frequency band width of the filter in step 450 is not carried out. Substantially, no extraction of the resonant frequency is made.

Figure 25:
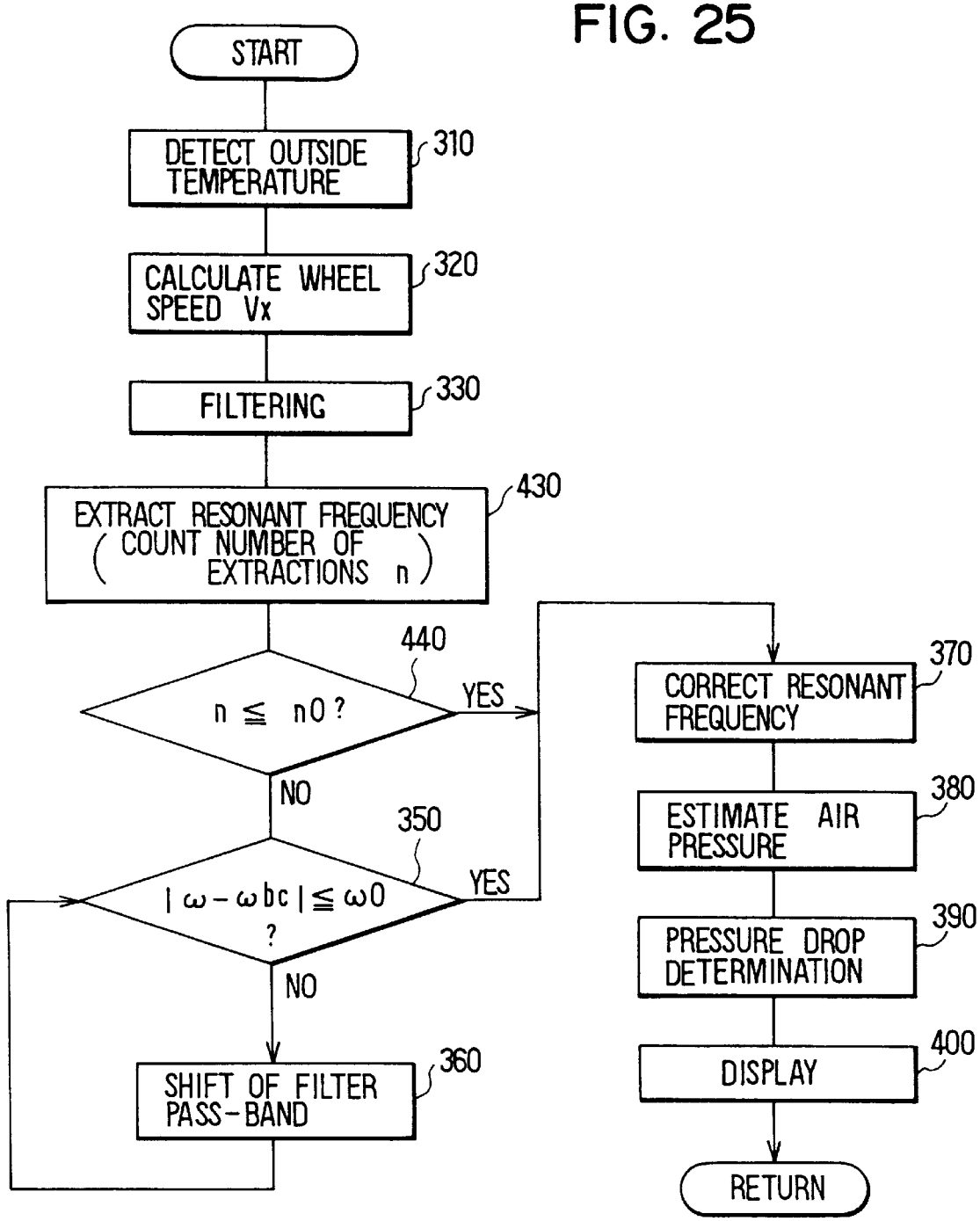
FIG. 25 is a flowchart illustrating control processing of a seventh embodiment.

The step 440 illustrated in FIG. 25 may be carried out in place of step 420 illustrated in FIG. 28. At this time, step 340 of FIG. 28 is modified as in step 430 of FIG. 25.

(Eleventh Embodiment)

Figure 29:
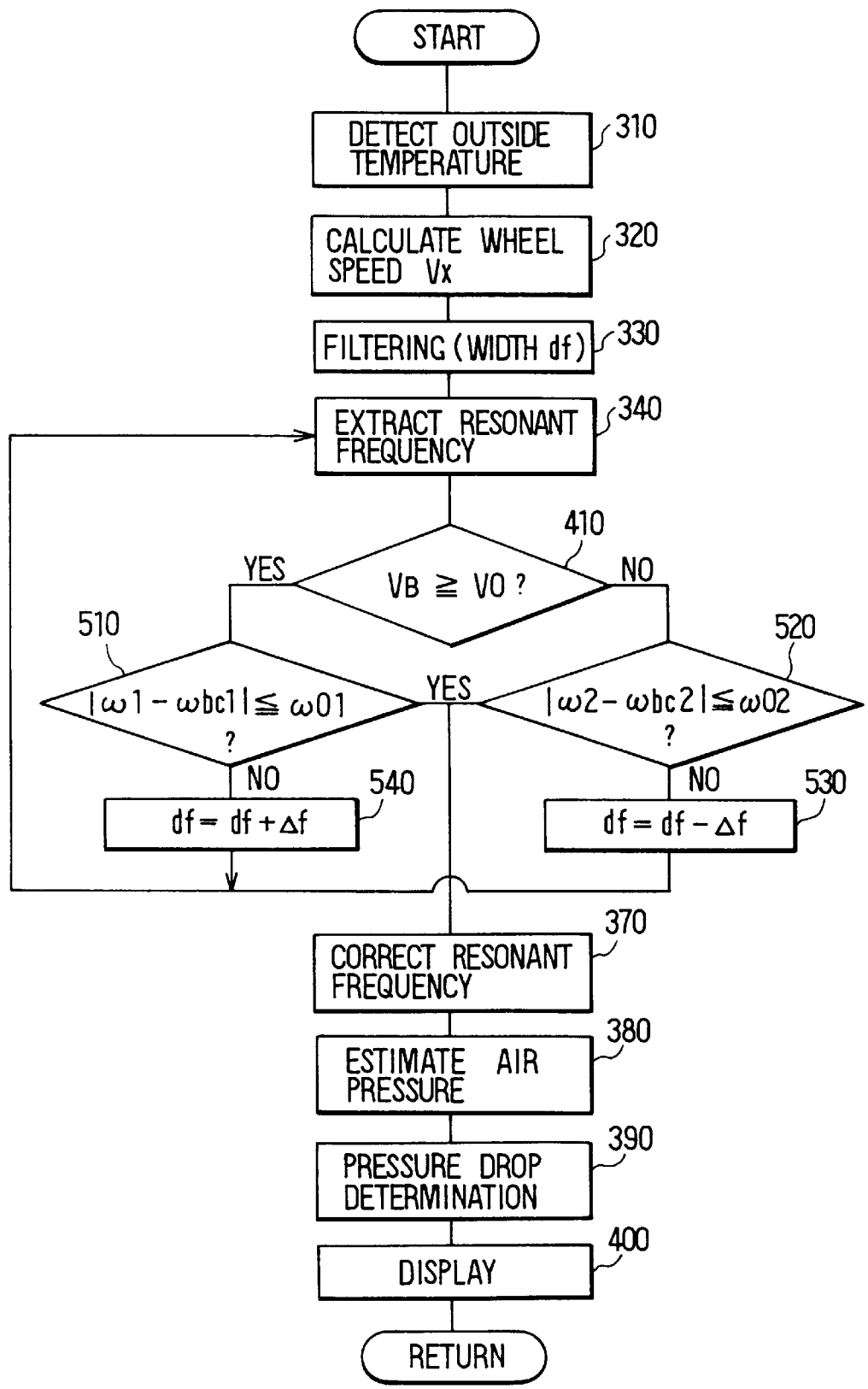
FIG. 29 is a flowchart illustrating control processing of an eleventh embodiment.

An eleventh embodiment is described by referring to FIG. 29. Those steps of this embodiment which are the same as those of the embodiments described thus far are denoted by the same step numbers and will not be described below.

In this eleventh embodiment, a decision is made as to whether the vehicle velocity VB is equal to or larger than the given velocity V0 (step 410). A decision is further made as to whether the pass-band width of the filter is reduced or increased (step 510 or 520, respectively). In particular, if the result of the decision made in step 410 is that the vehicle velocity VB is equal to or larger than the given velocity V0, control processing goes to step 510, where the absolute value of the difference between the resonant frequency ω1 extracted in step 340 and the center frequency ωbc1 of the bandpass filter used in finding the resonant frequency ω1 is compared with a given difference value ω01. When the absolute value is larger than the given difference value ω01, that is, the result of the decision is NO, control processing goes to step 540, where the filter width used to find the resonant frequency ω01 in step 340, or the pass-band width of the bandpass filter, is increased by the preset filter width Δf. Thus, a new pass-band is established. Control processing then goes back to step 340. The resonant frequency ωf is extracted, using the new filter range.

If the result of the decision made in step 410 is NO, control processing goes to step 520, where the absolute value of the difference between the resonant frequency ω extracted in step 340 and the center frequency ωbc2 of the bandpass filter used to find the resonant frequency ω is compared with a given difference value ω02. When control processing goes to step 520, the resonant frequency extracted in step 340 is expressed as ω2. The center frequencies ωbc1 and ωbc2 of the bandpass filter in extracting the resonant frequency in step 340 are updated to approach the extracted resonant frequency ω by modifying the passband width of the filter as required.

The necessity of increasing and decreasing the filter width according to the vehicle speed in this way depends on the relation between the intensity of the vibrational components contained in the wheel speed signal and the vehicle velocity. That is, at low to moderate vehicle speeds (10 km/h to 80 km/h), the vibrational components of the tire is relatively strong. The vibrational components containing the resonant frequency included in the wheel speed signal is relatively large. On the other hand, in a high vehicle speed region of more than 80 km/h, the vibrational components of the tire is relatively weak, for the following reason. In the high vehicle speed region, the number of vibrations applied to the tire due to fine unevenness on the road surface such as an asphalt surface per unit time increases. However, each vibration input level is small. It is considered that, when the signal intensity of the vibrational components is weak, the vibrational components including the resonant frequency of the tire is dispersed over a wide frequency range. Therefore, at low to moderate vehicle speeds, the signal intensity is sufficiently strong and so the priority is given to the accuracy by gradually narrowing the filter range (width). In the high-speed range, the frequency range (width) of the filter is gradually increased to secure the signal intensity sufficient to estimate the tire air pressure.

(Twelfth Embodiment)

Figure 30:
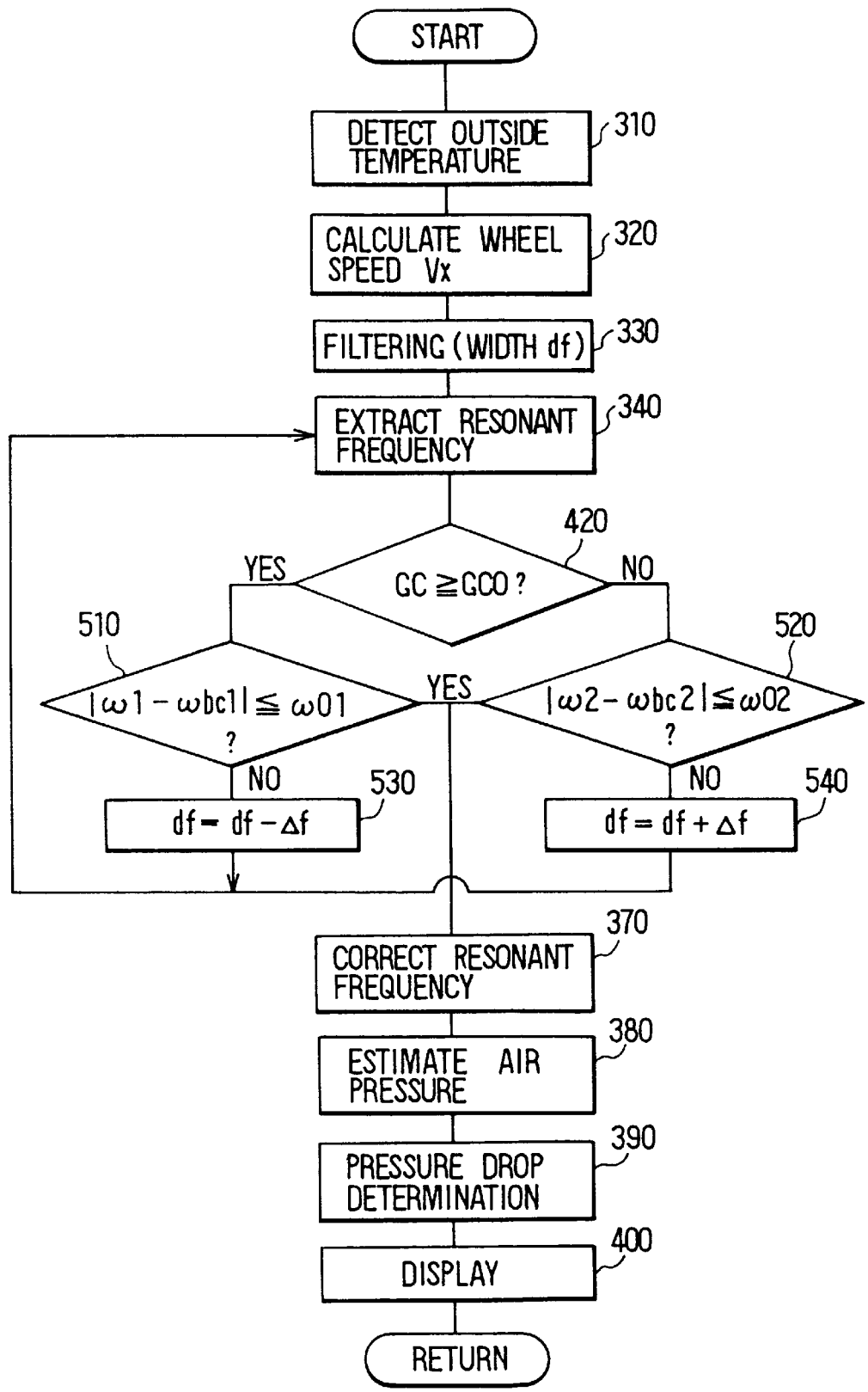
FIG. 30 is a flowchart illustrating control processing of a twelfth embodiment.

A twelfth embodiment is next described by referring to FIG. 30. In this twelfth embodiment, the signal intensity of the vibrational components is determined in step 420 after step 340. Only when the signal intensity is more than a preset signal intensity GCO, the pass-band width of the filter is decreased. When it is less than the preset signal intensity GCO, the pass-band of the filter is increased.

If the result of the decision made in step 420 is YES, control processing goes to step 510, where the absolute value of the difference between the extracted resonant frequency ω1 and the center frequency ωbc1 of the bandpass filter used to extract the resonant frequency ω1 in step 340 is compared with a preset difference value ω01. When the absolute value is within the given difference value ω01, the result of the decision is YES, and control processing goes to step 370. If the result of the decision is NO at step 510, control processing goes to step 530, where the frequency range of the bandpass filter is narrowed by a preset frequency width Δf.

If the result of the decision made in step 420 is NO, control processing goes to step 520, where the absolute value of the difference between the resonant frequency ω2 and the center frequency ωbc2 of the frequency range of the bandpass filter used to extract the resonant frequency ω2 is within a given difference value ω02. If the result of the decision is YES, control processing goes to step 370. If the result of the decision is NO, the frequency range of the bandpass filter is increased by the preset frequency width Δf in step 540. Control processing goes back to step 340 from steps 530 and 540, and the resonant frequency is extracted according to the corrected frequency range of the bandpass filter.

It is necessary to widen or narrow the filter width, i.e., the pass-band width of the bandpass filter used in step 340, in response to the signal intensity for the following reason. The relation between the signal intensity of the wheel speed sensor output and the intensity of the vibrational components of the tire including the resonant frequency component contained in the wheel speed signal is as follows. When the signal intensity of the wheel speed sensor output is large, the vibrational components of the tire is relatively large, and high accuracy of estimation of the tire air pressure can be expected. When the signal intensity is weak, the relative intensity of the vibrational components of the tire is weak. High accuracy of estimation of the tire air pressure cannot be expected. In a range of strong signal intensities, the pass-band of the bandpass filter is narrowed, thus improving the accuracy. In a range of weak signal intensities, the pass-band of the bandpass filter is gradually widened to permit detection and estimation of the tire air pressure, for securing sufficient tire signal intensity.

(Thirteenth Embodiment)

An thirteenth embodiment is next described by referring to FIG. 31. In this thirteenth embodiment, the resonant frequency is corrected according to the outside air temperature. In addition, the pass-band of a bandpass filter preset in step 330 is modified.

As mentioned previously, the pass-band of the bandpass filter used in step 330 and previously stored in the ROM 602 is limited. The resonant frequency ω extracted by this filter is affected by the outside air temperature. For example, when the outside air temperature becomes low while the tire air pressure is being unchanged, the extracted resonant frequency becomes high. Conversely, when the outside air temperature becomes high while the tire air pressure is being constant, the resonant frequency becomes low.

When a sensor for detecting the outside air temperature is disposed within an ECU cover, for example, it is difficult to detect the outside air temperature during vehicle traveling. In this case, therefore, the pass-band of the filter is initialized, using room temperature (e.g., 20 degrees) as a reference. On this assumption, when the outside air temperature during vehicle traveling is extremely high or low, the deviation of the center frequency from the actual resonant frequency in the pass-band previously built into the filter is large. The magnitude of this deviation affects the convergence time to bring the center frequency of the filter close to the actual resonant frequency.

Therefore, if the pass-band of the filter is corrected with the outside air temperature, the pass-band of the filter can be set in an appropriate range from the initial stage of estimation of the tire air pressure, i.e., immediately after the ignition switch is turned on. The convergence time for shift of the filter can be shortened. Hence, the tire air pressure can be estimated quickly.

In step 320 of FIG. 31, the wheel speed Vx is calculated from the output of the wheel speed sensor. Control processing then goes to step 600, where the pass-band of the filter is set or corrected based upon information about the outside air temperature, the information being accepted in step 310. If the outside air temperature is higher than a reference temperature (e.g., 20 degrees) by a given temperature, the pass-band of the filter is shifted by a given width toward the lower-frequency side. If the outside air temperature is lower than the reference temperature by more than a given value, a correction is made to shift the pass-band of the filter by a given width toward the higher-frequency side. The wheel speed sensor output is subject to filtering process by the filter corrected in this way in step 330.

What is claimed is:

1. An apparatus for estimating tire air pressure, comprising:

vibrational component output means for producing a signal including vibrational components of a tire during travel of a vehicle;

vibrational component output means for producing a signal including vibrational components of a tire during travel of a vehicle;

extracting means for extracting either one of a resonant frequency of the vibrational components and a tire spring constant from the signal;

air pressure-estimating means for estimating an air pressure inside the tire from either one of the resonant frequency and the tire spring constant extracted by the extracting means;

tire temperature-associated value-extracting means for extracting a value associated with a tire temperature that affects the resonant frequency and the tire spring constant; and correcting means for correcting effects of the tire temperature on either one of the resonant frequency and the tire spring constant extracted by the extracting means based on the value associated with the tire temperature; wherein the tire temperature-associated value-extracting means extracts outside air temperature as the value associated with the tire temperature using a device mounted in a signal processor for processing said signal including the vibrational components of the tire.

2. An apparatus for estimating tire air pressure as set forth in claim 1, wherein the tire temperature-associated value-extracting means estimates the value associated with the tire temperature based on a temperature of the device detected at a time when the temperature of the device inside the signal processor has a correlative relationship with an outside air temperature.

3. An apparatus for estimating tire air pressure as set forth in claim 1, wherein the tire temperature-associated value-extracting means estimates the value associated with the tire temperature from plural values detected immediately after an ignition switch of the vehicle is turned on.

4. An apparatus for estimating tire air pressure as set forth in claim 3, wherein the tire temperature-associated value-extracting means estimates the value associated with the tire temperature from a minimum value of the plural values detected immediately after the ignition switch of the vehicle is turned on.

5. An apparatus for estimating tire air pressure as set forth in claim 1, wherein the correcting means corrects at least one of the resonant frequency, the tire spring constant, and the air pressure estimated by the air pressure estimating means based on the value associated with the tire temperature extracted by said tire temperature-associated value-extracting means.

6. An apparatus for estimating tire air pressure as set forth in claim 1, wherein the extracting means comprises linear forecasting means that introduces a linear forecasting model of vibrations of the tire to a time sequence signal including the vibrational components produced from the vibrational component output means, identifies parameters of the introduced linear forecasting model, and extracts the resonant frequency of the vibrational components.

7. An apparatus for estimating tire air pressure as set forth in claim 6, wherein the linear forecasting means comprises:

parameter-identifying means that introduces the linear forecasting model with respect to vibrations of the tire given by $$y(k) = -c1y(k-1) - c2y(k-2) + m(k) \qquad (1)$$

where k is a sampling time, y(k) is the time sequence signal including the vibrational components of the tire, and m(k) is an external disturbance, and for identifying the parameters c1 and c2; and resonant frequency-calculating means for calculating the resonant frequency using the identified parameters c1 and c2.

8. An apparatus for estimating tire air pressure as set forth in claim 7, wherein the parameter-identifying means identifies the parameters c1 and c2 by a least squares method.

9. An apparatus for estimating tire air pressure as set forth in claim 1, wherein the extracting means comprises FFT calculating means for performing high-speed Fourier transform (FFT) calculations on the signal including the vibrational components of the tire produced from the vibrational component output means, and wherein the air pressure-estimating means estimates the air pressure from a resonant frequency of a frequency spectrum obtained by the FFT calculations.

10. An apparatus for estimating tire air pressure, comprising:

vibrational component output means for producing a signal including vibrational components of a tire during travel of a vehicle;

extracting means for extracting either one of a resonant frequency of the vibrational components and a tire spring constant from the signal;

air pressure-estimating means for estimating an air pressure inside the tire from either one of the resonant frequency and the tire spring constant extracted by the extracting means;

tire temperature-associated value-extracting means for extracting a value associated with a tire temperature that affects the resonant frequency and tire spring constant;

determining means for determining based on relations between the air pressure estimated by the air pressure-estimating means and a present determination value as to whether the air pressure is abnormal or not; and correcting means for correcting the preset determination value based on the value associated with the tire temperature extracted by the tire temperature-associated value-extracting means; wherein the tire temperature-associated value-extracting means extracts outside air temperature as the value associated with the tire temperature using a device mounted in a signal processor for processing said signal including the vibrational components of the tire.

11. An apparatus for estimating tire air pressure as set forth in claim 10, wherein the extracting means comprises linear forecasting means that introduces a linear forecasting model of vibrations of the tire to a time sequence signal including the vibrational components produced from the vibrational component output means, identifies parameters of the introduced linear forecasting model, and extracts the resonant frequency of the vibrational components.

12. An apparatus for estimating tire air pressure as set forth in claim 11, wherein the linear forecasting means comprises:

parameter-identifying means the introduces the linear forecasting model with respect to vibrations of the tire given by $$y(k)=-c1y(k-1)-c2y(k-2)+m(k) \quad (1)$$

where k is a sampling time, y(k) is the time sequence signal including the vibrational components of the tire, and m(k) is an external disturbance, and for identifying the parameters c1 and c2; and resonant frequency-calculating means for calculating the resonant frequency using the identified parameters c1 and c2.

13. An apparatus for estimating tire air pressure as set forth in claim 12, wherein the parameter-identifying means identifies the parameters c1 and c2 by a least squares method.

14. An apparatus for estimating tire air pressure as set forth in claim 10, wherein the extracting means comprises FFT calculating means for performing high-speed Fourier transform (FFT) calculations on the signal including the vibrational components of the tire produced from the vibrational component output means, and wherein the air pressure-estimating means estimates the air pressure from a resonant frequency of a frequency spectrum obtained by the FFT calculations.

15. An apparatus for estimating tire air pressure, comprising:

wheel speed-detecting means for detecting a wheel speed signal during travel of a vehicle for wheels of the vehicle, the wheel speed signal including vibrational components of a tire;

a signal processor installed within a housing, the signal processor comprising:

extracting means for extracting either one of a resonant frequency of the vibrational components and a tire spring constant from each wheel speed signal, air pressure-estimating means for estimating air pressures inside the tires of each of the wheels based on either one of the resonant frequency or the tire spring constant extracted by the extracting means, determining means for determining based on a relation between the tire air pressures estimated by the air pressure-estimating means and a preset determination value as to whether the tire air pressures are abnormal or not, and correcting means for correcting effects of a tire temperature on either one of the resonant frequency and the tire spring constant with respect to each of the wheels based on a value associated with the tire temperature; and a temperature-sensing device for sensing a temperature inside the signal processor to extract the value associated with the tire temperature used in the correcting means, the temperature-sensing device being disposed inside the signal processor.

16. An apparatus for estimating tire air pressure, comprising:

wheel speed-detecting means for detecting a wheel speed signal during travel of a vehicle for wheels of the vehicle, the wheel speed signal including vibrational components of a tire;

a signal processor installed within a housing, the signal processor comprising:

extracting means for extracting either one of a resonant frequency of the vibrational components and a tire spring constant from each wheel speed signal, air pressure-estimating means for estimating air pressure inside the tires of each of the wheels based on either one of the resonant frequency or the tire spring constant extracted by the extracting means, determining means for determining based on a relation between the tire air pressure estimated by the air pressure-estimating means and a preset determination value as to whether the tire air pressures are abnormal or not, anti-skid control means for controlling braking forces applied to the wheels so as to moderate tendencies of the wheels to lock, the anti-skid control means using wheel speeds calculated from the wheel speed signals, and correcting means for correcting the preset determination value with respect to each of the wheels based on a value associated with the tire temperature; and a temperature-sensing device for sensing a temperature inside the signal processor to extract the value associated with the tire temperature used in the correcting means, the temperature-sensing device being disposed inside the signal processor.

17. An apparatus for estimating tire air pressure, comprising:

wheel speed-detecting means for detecting a wheel speed signal during travel of a vehicle for wheels of the vehicle, the wheel speed signal including vibrational components of a tire;

an integrated signal processor comprising:

extracting means for extracting either one of a resonant frequency of the vibrational components and a tire spring constant from each wheel speed signal, air pressure-estimating means for estimating air pressure inside the tires of each of the wheels based on either one of the resonant frequency and the tire spring constant extracted by the extracting means, determining means for determining based on a relation between the tire air pressure estimated by the air pressure-estimating means and a present determination value as to whether the air pressures are abnormal or not, anti-skid control means for controlling braking forces applied to the wheels so as to moderate tendencies of the wheels to lock, the anti-skid control means using wheel speeds calculated based on the wheel speed signals;

a temperature-sensing device for sensing a temperature inside the signal processor as an outside air temperature to extract the value associated with the tire temperature, which affects either one of the resonant frequency and the spring constant extracted by the extracting means, the temperature-sensing device being disposed inside the signal processor; and correcting means for correcting at least one of the preset determination value, either one of the resonant frequency and the tire spring constant extracted by the extracting means, and the air pressure estimated by the air pressure-estimating means, wherein the temperature-sensing device detects temperatures a preset number of times immediately after an ignition switch of the vehicle is turned on, and the correcting means makes the correction based on a minimum value of temperatures detected by the temperature-sensing device.

18. An apparatus for estimating tire air pressure, comprising:

detection means for detecting a signal including vibrational components of a tire during travel of a vehicle;

extracting means for extracting either one of a resonant frequency of the vibrational components and a tire spring constant, which is associated with a tire air pressure, from the vibrational components detected by the detection means;

a signal processing-filter for allowing components of a signal having frequencies within a preset frequency band to pass and for feeding the passed signal to the extracting means;

air pressure-estimating means for estimating an air pressure in the tire based on either one of the resonant frequency and the tire spring constant extracted by the extracting means; and shifting means for shifting the frequency band of the signal processing filter according to either one of the resonant frequency and the tire spring constant extracted by the extracting means while a width of the frequency band is maintained constant.

19. An apparatus for estimating tire air pressure as set forth in claim 18, wherein the shifting means shifts the frequency band of the signal processing filter in such a way that either one of the resonant frequency and the tire spring constant extracted by the extracting means or an average value of either ones of previously extracted plural resonant frequencies and previously extracted plural tire spring constants is brought almost into a center value of the frequency band.

20. An apparatus for estimating tire air pressure, comprising vibrational component output means for producing a signal including vibrational components of a tire during travel of a vehicle;

extracting means for extracting either one of a resonant frequency of the vibrational components and a tire spring constant from the signal;

air pressure-estimating means for estimating an air pressure inside the tire from either one of the resonant frequency and the tire spring constant extracted by the extracting means;

tire temperature-associated value-extracting means for extracting a value associated with a tire temperature that affects the resonant frequency and the tire spring constant; and correcting means for correcting effects of the tire temperature on either one of the resonant frequency and the tire spring constant extracted by the extracting means based on the value associated with the tire temperature; wherein the tire temperature-associated value-extracting means extracts outside air temperature as the value associated with the tire temperature using a device mounted in a signal processor for processing said signal including the vibrational components of the tire;

wherein the shifting means shifts the frequency band of the signal processing filter in such a way that a difference between either one of the resonant frequency and the tire spring constant extracted by the extracting means or an average value of either ones of previously extracted plural resonant frequencies and previously extracted plural tire spring constants and a center value of the frequency band falls within a predetermined range.

21. An apparatus for estimating tire air pressure as set forth in claim 20, wherein the shifting means determines whether a value extracted by the extracting means is used for the tire air pressure-estimating means to estimate the air pressure by determining whether the difference falls within the predetermined range value, and wherein the shifting means repeatedly shifts the frequency band until the difference falls within the predetermined range.

22. An apparatus for estimating tire air pressure as set forth in claim 18, wherein the shifting means shifts the frequency band in response to ambient temperature.

23. An apparatus for estimating tire air pressure as set forth in claim 18, wherein the shifting means shifts the frequency band only when either one of a vehicle speed and an intensity of a signal having passed through the signal-processing filter satisfies a predetermined condition.

24. An apparatus for estimating tire air pressure as set forth in claim 18, wherein the shifting means allows and prohibits shift of the frequency band according to a request response time set in the tire air pressure-estimating apparatus.

25. An apparatus for estimating tire air pressure, comprising:

detection means for detecting a signal including vibrational components of a tire during travel of a vehicle;

a signal processing-filter for allowing components of the signal that have frequencies within a preset frequency band to pass;

extracting means for extracting either one of a resonant frequency of the vibrational components and a tire spring constant, which is associated with a tire air pressure, from the signal passed from the signal processing-filter;

air pressure-estimating means for estimating an air pressure in the tire based on either one of the resonant frequency and the tire spring constant extracted by the extracting means; and modifying means for modifying a width of the frequency band of the signal-processing filter.

26. An apparatus for estimating tire air pressure as set forth in claim 25, wherein the modifying means modifies the width of the frequency band of the signal-processing filter according to at least one of intensity of the signal having passed through the signal-processing filter, a vehicle speed, and either one of the resonant frequency and the tire spring constant extracted by the extracting means.

27. An apparatus for estimating tire air pressure as set forth in claim 25, wherein the modifying means varies the width of the frequency band of the signal processing filter according to a request response time set in the tire air pressure-estimating apparatus.

28. An apparatus for estimating tire air pressure as set forth in claim 25, wherein the modifying means modifies the width of the frequency band of the signal processing filter only when either one of a vehicle speed or an intensity of the signal having passed through the signal-processing filter satisfies a predetermined condition.

29. An apparatus for estimating tire air pressure, comprising:

detection means for detecting a signal including vibrational components of a tire during travel of a vehicle;

extracting means for extracting either one of a resonant frequency of the vibrational components and a tire spring constant, which is associated with a tire pressure, from the signal;

a signal processing-filter for allowing components of the signal that have frequencies within a preset frequency band to pass and for feeding the passed signal to the extracting means;

air pressure-estimating means for estimating an air pressure in the tire based on either one of the resonant frequency and the tire spring constant extracted by the extracting means; and shifting-and-modifying means for shifting the frequency band of the signal-processing filter and modifying a width of the frequency band of the signal-processing filter in response to either one of the resonant frequency and the tire spring constant extracted by the extracting means.

30. An apparatus for estimating tire air pressure as set forth in claim 29, wherein the shifting-and-modifying means first narrows the width of the frequency band from a wide frequency band and then shifts the narrowed frequency band.

* * * * *